(12) United States Patent
Gorman et al.

(10) Patent No.: US 8,943,095 B2
(45) Date of Patent: Jan. 27, 2015

(54) SYSTEMS AND METHODS FOR ACCESSING WEB PAGES USING NATURAL LANGUAGE

(71) Applicant: Glace Holdings LLC, Del Mar, CA (US)

(72) Inventors: John G. Gorman, Del Mar, CA (US); John W. R. Gorman, Auckland (NZ)

(73) Assignee: Deep Sky Concepts, Inc., San Diego, CA (US)

( * ) Notice: Subject to any disclaimer, the term of this patent is extended or adjusted under 35 U.S.C. 154(b) by 158 days.

(21) Appl. No.: 13/624,762

(22) Filed: Sep. 21, 2012

(65) Prior Publication Data

US 2013/0090920 A1    Apr. 11, 2013

Related U.S. Application Data

(63) Continuation of application No. 12/789,368, filed on May 27, 2010, now Pat. No. 8,275,788, which is a continuation-in-part of application No. 12/620,513, filed on Nov. 17, 2009, now Pat. No. 8,214,366.

(51) Int. Cl.
*G06F 17/30* (2006.01)
*G06F 17/28* (2006.01)
*G06F 17/27* (2006.01)

(52) U.S. Cl.
CPC ............ *G06F 17/28* (2013.01); *G06F 17/2705* (2013.01); *G06F 17/30666* (2013.01); *G06F 17/30734* (2013.01); *G06F 17/30864* (2013.01)
USPC .......................................................... 707/771

(58) Field of Classification Search
USPC ............ 707/2, 3, 771; 273/292; 709/204–206
See application file for complete search history.

(56) References Cited

U.S. PATENT DOCUMENTS 5,819,303 A   10/1998   Calhoun et al.
6,101,537 A    8/2000   Edelstein et al.
(Continued)

FOREIGN PATENT DOCUMENTS

KR   1019990078925 A   11/1999
KR      100368300 B1    1/2003

OTHER PUBLICATIONS

International Search Report and Written Opinion for PCT/US09/42388 mailed Nov. 30, 2009, (11 pages).
(Continued)

*Primary Examiner* — Etienne Leroux
(74) *Attorney, Agent, or Firm* — Procopio Cory Hargreaves & Savitch LLP; Noel C. Gillespie

(57) ABSTRACT

Systems and methods for building an interface that receives and responds to varied natural language expressions. In an embodiment, the system receives a natural language expression in text or audio, and translates it by building at least one data structure which reflects the concepts expressed in the natural language expression. The data structure may comprise a symbol representing each concept. In an embodiment, a parser utilizes the data structure to parse language expressions to single concept symbols that represent the meaning of the expressions. Response actions may also be performed in response to the parsed language expressions. In addition, a parser may receive a single concept symbol, and generate one or many natural language expressions of the meaning of the concept symbol. Furthermore, the system may be configured to understand the local meaning of words and phrases.

21 Claims, 12 Drawing Sheets

| ID | Type | Reference | Vocab | Lookup | CF | Concept | Response | Text |
|---|---|---|---|---|---|---|---|---|
| 174 | | 001.001.287 | Does | | | Does | | Does |
| 175 | | 001.001.288 | Batman | | | Batman | | Batman |
| 176 | | 001.001.289 | have | | | have | | have |
| 177 | | 001.001.290 | a | | | a | | a |
| 178 | | 001.001.291 | nemesis | | | nemesis | | nemesis |
| 179 | | 001.001.292 | ? | | | ? | | ? |
| 182 | | 001.001.293 | | a~nemesis | C+ | AN | | a nemesis |
| 183 | | 001.001.294 | | have~AN | C+ | HAN | | have a nemesis |
| 184 | | 001.001.295 | | Batman~HAN | C+ | BHAN | | Batman have a nemesis |
| 185 | | 001.001.296 | | Does~BHAN | C+ | DBHAN | YTJ | Does Batman have a nemesis |
| 186 | | 001.001.297 | | DBHAN~? | C+ | DBHAN? | YTJ | Does Batman have a nemesis? |
| 187 | | 001.001.298 | | | | YTJ | | Yes, The Joker |
| 188 | | 001.001.299 | | | | | | |

(56) References Cited

U.S. PATENT DOCUMENTS

| | | |
|---|---|---|
| 6,411,950 B1 | 6/2002 | Moricz et al. |
| 7,085,708 B2 | 8/2006 | Manson |
| 7,809,714 B1 | 10/2010 | Smith |
| 8,214,366 B2 | 7/2012 | Gorman et al. |
| 8,271,264 B2 | 9/2012 | Gorman et al. |
| 8,275,788 B2 | 9/2012 | Gorman et al. |
| 8,521,512 B2 | 8/2013 | Gorman et al. |
| 2001/0032199 A1 | 10/2001 | Delo |
| 2002/0002575 A1 | 1/2002 | Eisler et al. |
| 2002/0077806 A1 | 6/2002 | Tarbouriech et al. |
| 2003/0144831 A1 | 7/2003 | Ford |
| 2004/0181390 A1 | 9/2004 | Manson |
| 2004/0267724 A1 | 12/2004 | Hoffman |
| 2005/0240576 A1 | 10/2005 | Piscitello et al. |
| 2006/0041424 A1 | 2/2006 | Todhunter et al. |
| 2007/0106499 A1 | 5/2007 | Dahlgren et al. |
| 2007/0112714 A1 | 5/2007 | Fairweather |
| 2007/0130112 A1 | 6/2007 | Lin |
| 2007/0132631 A1 | 6/2007 | Henson et al. |
| 2007/0170649 A1* | 7/2007 | Collins .......................... 273/292 |
| 2007/0185859 A1 | 8/2007 | Flowers et al. |
| 2007/0203693 A1 | 8/2007 | Estes |
| 2008/0021924 A1 | 1/2008 | Hall et al. |
| 2008/0040099 A1 | 2/2008 | Wu et al. |
| 2009/0006389 A1 | 1/2009 | Piscitello et al. |
| 2009/0112835 A1 | 4/2009 | Elder |
| 2009/0276396 A1 | 11/2009 | Gorman et al. |

OTHER PUBLICATIONS

International Search Report and Written Opinion for PCT/US10/057099 mailed Aug. 2, 2011 (9 pages).

International Search Report and Written Opinion PCT/US11/38413 mailed Feb. 17, 2012 (3 pages).

Y. Wilks, "Is There Progress on Talking Sensibly to Machines?" Science, 318: 927-928 (2007).

* cited by examiner

| ID | Type | Reference | Vocab | Lookup | CF | Concept | Response | Text |
|---|---|---|---|---|---|---|---|---|
| 174 | | 001.001.287 | Does | | | Does | | Does |
| 175 | | 001.001.288 | Batman | | | Batman | | Batman |
| 176 | | 001.001.289 | have | | | have | | have |
| 177 | | 001.001.290 | a | | | a | | a |
| 178 | | 001.001.291 | nemesis | | | nemesis | | nemesis |
| 179 | | 001.001.292 | ? | | | ? | | ? |
| 182 | | 001.001.293 | | a~nemesis | C+ | AN | | a nemesis |
| 183 | | 001.001.294 | | have~AN | C+ | HAN | | have a nemesis |
| 184 | | 001.001.295 | | Batman~HAN | C+ | BHAN | | Batman have a nemesis |
| 185 | | 001.001.296 | | Does~BHAN | C+ | DBHAN | YTJ | Does Batman have a nemesis |
| 186 | | 001.001.297 | | DBHAN~? | C+ | DBHAN? | YTJ | Does Batman have a nemesis? |
| 187 | | 001.001.298 | | | | YTJ | | Yes, The Joker |
| 188 | | 001.001.299 | | | | | | |

FIG. 1

| ID | Type | Reference | Vocab. | Lookup | CF | Concept | Response | Text |
|---|---|---|---|---|---|---|---|---|
| 347 | | 001.002.301 | A | | | A | | A |
| 348 | | 001.002.302 | B | | | B | | B |
| 349 | | 001.002.303 | C | | | C | | C |
| 350 | | 001.002.304 | , | | | , | | , |
| 351 | | 001.002.305 | and | | | and | | and |
| 352 | | 001.002.306 | or | | | or | | or |
| 353 | | 001.002.307 | | A, | | A, | | A, |
| 364 | | 001.002.307 | | A, ~and13 | | and13 | | A, B and C |
| 365 | | 001.002.307 | | A, ~or13 | | or113 | | A, B or C |
| 354 | | 001.002.308 | | and~C | | AC | | and C |
| 361 | | 001.002.309 | | or~C | | OC | | or C |
| 355 | | 001.002.310 | | B~AC | | and13 | | B and C |
| 363 | | 001.002.311 | | B~OC | | or13 | | B or C |
| 356 | | 001.002.312 | | and13~BAC | | and13 | | A, B and C |
| 362 | | 001.002.313 | | or13~BAC | | or13 | | A, B or C |
| 359 | | 001.002.314 | | | | | | |

FIG. 4

| ID | Type | Reference | Vocab | Lookup | CF | Concept | Response | Text |
|---|---|---|---|---|---|---|---|---|
| 98 | | 001.002.203 | a | | | a | | a |
| 105 | | 001.002.204 | king | | | king | | king |
| 109 | | 001.002.205 | queen | | | queen | | queen |
| 112 | | 001.002.206 | beautiful | | | beautiful | | beautiful |
| 113 | | 001.002.207 | princess | | | princess | | princess |
| 118 | | 001.002.208 | | a~king | C+ | AK | | a king |
| 119 | | 001.002.209 | | a~queen | C+ | AQ | | a queen |
| 120 | | 001.002.210 | | beautiful~princess | C+ | BP | | beautiful princess |
| 122 | | 001.002.211 | | a~BP | C+ | ABP | | a beautiful princess |

FIG. 5

| | | | AM WAM DWAM $B SD AS IA DWAMA DWAMA TH CB CBC 5,000CBC A5,000CBC TH A5,000CBC BTH A5,000CBC D |
|---|---|---|---|
| 25 | 002.002.000 | | |
| 26 | 002.002.001 | | |
| 1 | 002.002.050 | disney | disney |
| 2 | 002.002.051 | will | will |
| 3 | 002.002.052 | acquire | acquire |
| 4 | 002.002.053 | marvel | marvel |
| 5 | 002.002.054 | in | in |
| 6 | 002.002.055 | acquire | acquire |
| 7 | 002.002.056 | $4 | $4 |
| 8 | 002.002.057 | billion | billion |
| 9 | 002.002.058 | deal | deal |
| 10 | 002.002.059 | | |
| 11 | 002.002.060 | bringing | bringing |
| 12 | 002.002.061 | the | the |
| 13 | 002.002.062 | hulk | hulk |
| 14 | 002.002.063 | and | and |
| 15 | 002.002.064 | 5,000 | 5,000 |
| 16 | 002.002.065 | comic | comic |
| 17 | 002.002.066 | book | book |
| 18 | 002.002.067 | characters | characters |
| 19 | 002.002.068 | into | into |
| 20 | 002.002.069 | the | the |
| 21 | 002.002.070 | disney | disney |
| 22 | 002.002.071 | fold | fold |
| 23 | 002.002.072 | | |
| 24 | 002.002.073 | acquire-marvel | AM | acquire marvel |
| 27 | 002.002.074 | will-AM | WAM | will acquire marvel |
| 28 | 002.002.075 | disney-WAM | DWAM | disney will acquire marvel |
| 29 | 002.002.076 | $4-billion | $B | $4 billion |
| 30 | 002.002.077 | $B-deal | SD | $4 billion deal |
| 31 | 002.002.078 | a-SD | A$ | a $4 billion deal |
| 32 | 002.002.079 | in-A$ | IA | in a $4 billion deal |
| 33 | 002.002.080 | DWAM-IA | DWAMA | disney will acquire marvel in a $4 billion deal |
| 34 | 002.002.081 | DWAMA- | DWAMA, | disney will acquire marvel in a $4 billion deal, |
| 35 | 002.002.082 | the-hulk | TH | the hulk |
| 36 | 002.002.083 | comic-book | CB | comic book |
| 37 | 002.002.084 | CB-characters | CBC | comic book characters |
| 38 | 002.002.085 | 5,000-CBC | 5,000CBC | 5,000 comic book characters |
| 39 | 002.002.086 | and-5,000CBC | A5,000CBC | and 5,000 comic book characters |
| 40 | 002.002.087 | TH-A5,000CBC | TH A5,000CBC | the hulk and 5,000 comic book characters |
| 41 | 002.002.088 | bringing-TH A5,000CBC | BTH A5,000CBC | bringing the hulk and 5,000 comic book characters |
| 42 | 002.002.089 | DWAM A,-BTH A5,000CBC | DWAMA,BTH A5,000CBC | disney will acquire marvel in a $4 billion deal, bringing the hulk and 5,000 comic book characters |
| 43 | 002.002.090 | disney-fold | DF | disney fold |
| 44 | 002.002.091 | the-DF | TDF | the disney fold |
| 45 | 002.002.092 | into-TDF | ITDF | into the disney fold |
| 46 | 002.002.093 | DWAM A,BTH A5,000CBC-ITDF | DWAMA,BTH A5,000CBC ITDF | disney will acquire marvel in a $4 billion deal, bringing the hulk and 5,000 comic book characters into the disney fold |
| 48 | 002.002.094 | | |
| 49 | 002.002.095 | | |

FIG. 7

| ID | Reference | Vocab | Lookup | Cf | Concept |
|---|---|---|---|---|---|
| 1520 | 003.001.101 | | C~D | | CD |
| 1507 | 003.001.102 | | B~CD | | BCD |
| 1511 | 003.001.103 | | A~BCD | | ABCD |
| 1502 | 003.001.104 | | | | |
| 1538 | 003.001.104 | | | | |
| 1493 | 003.001.105 | let | let~me | | letme |
| 1503 | 003.001.110 | see | | | see |
| 1514 | 003.001.115 | how | | | how |
| 1491 | 003.001.120 | me | | | me |
| 1497 | 003.001.125 | | letme~see | | show |
| 1515 | 003.001.130 | | show~how | | A |
| 1492 | 003.001.135 | show | show~me | | show |
| 1535 | 003.001.140 | | | | |
| 1510 | 003.001.145 | | show~SsPDF | | ABCD |
| 1522 | 003.001.150 | | showSsPDF~onSsPDF | | ABCD |
| 1532 | 003.001.155 | | how~BCD | | howBCD |
| 1536 | 003.001.160 | | on~howBCD | | onhowBCD |
| 1537 | 003.001.165 | | ABCD~onhowBCD | | ABCD |
| 1506 | 003.001.170 | | SAGE's~PDF | | SsPDF |
| 1529 | 003.001.175 | PDF | PDF~document | | PDF |
| 1530 | 003.001.180 | document | | | document |
| 1531 | 003.001.185 | | | | |
| 1495 | 003.001.190 | fetch | | | show |
| 1496 | 003.001.195 | get | | | show |
| 1494 | 003.001.200 | download | | | show |
| 1498 | 003.001.205 | | | | |
| 1499 | 003.001.210 | SAGE's | SAGE~Software's | | SAGE's |
| 1541 | 003.001.210 | SAGE's | B~company's | | SAGE's |
| 1513 | 003.001.215 | SAGE | | | SAGE |
| 1500 | 003.001.220 | software | | | software |
| 1540 | 003.001.220 | software's | | | software's |
| 1501 | 003.001.225 | company's | | | company's |
| 1504 | 003.001.230 | | SAGE~software | | B |
| 1521 | 003.001.235 | | SAGE's~software | | B |
| 1533 | 003.001.240 | | | | |
| 1505 | 003.001.245 | inspires | | | C |
| 1525 | 003.001.250 | enables | helps~enable | | C |
| 1526 | 003.001.255 | helps | helps~make | | C |
| 1527 | 003.001.260 | facilitates | | | C |
| 1528 | 003.001.265 | aids | | | C |
| 1523 | 003.001.270 | | | | |
| 1524 | 003.001.275 | | | | |
| 1509 | 003.001.280 | better | | | better |
| 1516 | 003.001.285 | business | | | business |
| 1517 | 003.001.290 | decisions | | | decisions |
| 1518 | 003.001.295 | | business~decisions | | BD |
| 1519 | 003.001.300 | | better~BD | | D |
| 1512 | 003.001.320 | | please~ABCD | | ABCD |

FIG. 10

| Yes | notA | notB |
|-----|------|------|
| No  | notA | B    |
|     | A    | notB |
|     | A    |      |

It's Yes if notA and notB
It's Yes unless A or B
It's No if A or B
It's No unless notA and notB M5 Table notA ~ notB = Yes
notA ~ B = No
A ~ notB = No
A ~ B = No

FIG. 12

SYSTEMS AND METHODS FOR ACCESSING WEB PAGES USING NATURAL LANGUAGE

PRIORITY

This application claims the benefit of priority as a continuation under 35 U.S.C. §120 of U.S. patent application Ser. No. 12/789,368, entitled "System and Methods for Accessing Web Pages Using Natural Language," filed May 27, 2010, and issuing as U.S. Pat. No. 8,275,788 on Sep. 25, 2012, which in turn claims priority as a continuation-in-part under 35 U.S.C. §120 to U.S. patent application Ser. No. 12/620,513, entitled "Systems and Methods for Generating a Language Database that Can Be Used for Natural Language Communication with a Computer," filed on Nov. 17, 2009, and issued as U.S. Pat. No. 8,214,366 on Jul. 3, 2012, both of which are hereby incorporated herein by reference in their entireties.

BACKGROUND

1. Technical Field

The embodiments described herein are directed to natural language communication with a computer and more particularly to methods for creating human-machine interfaces and natural language accessible registry systems, and for accessing web pages using natural language and using such methods to improve print and other traditional advertising.

2. Background

Developing a machine capable of understanding human thought and natural language has been the goal of computer science since Alan Turing first proposed the Turing Test in 1950; however, the ability to develop such a machine has remained elusive. Conventional computer programs can process text and do word search and speech to text at a high level, no current program is able to understand in any real depth the meaning incorporated in text. In co-pending U.S. patent application Ser. No. 12/429,199 (the '199 application), entitled "Systems and Methods for Natural Language Communication With a Computer," filed Apr. 23, 2009, a database medium is presented that allows such a machine to be implemented. As described in the '199 application, the implementation of such a machine is dependent on a database implementation of what can be term a fifth medium, or M5 database.

Several examples methods for developing an M5 database are discussed in the '199 application. Some of these methods will be discussed or summarized below, but to briefly recap: the systems and methods described in the '199 application views all three language elements: lexical words, grammaticals, and punctuation marks simply as symbols for concepts, as operands in an algebraic expression. Language is the choreography of thought; language comprises precise instructions for building complex concepts in the mind of a second person. In other words, to understand written or oral communication, a listener must perform a series of binary mental operations on the concepts presented in the communication to construct a complex concept in their minds. Accordingly, when a sensible language expression spells out the series of binary mental operations needed to construct a complex concept, it is using the methods of algebra. In evaluating an algebraic expression, the order of precedence of operations on adjacent operands is critical if the correct result is to be obtained and order of precedence is equally so in parsing a language expression. But, unlike in algebraic expressions, where explicit indicators of precedence are provided, in language expressions these indicators are missing and must be reinserted by the listener.

An M5 database comprises the equivalent of these mental operations such that a computer can parse textual input just as a human would.

In the '513 application, systems and methods were presented for automatically building such an M5 database. With easy methods for generating and using such a database, numerous applications can now be created that will allow the use of natural language to simplify what have become everyday interactions with computers. For example, customized web page addresses in plain English can be constructed that would allow a user to access a web page even if they didn't remember the exact Web page address (URL). The discipline of typing in letter perfect URLs into a browser is not needed. These are benefits current browsers and web page address techniques and protocols cannot achieve.

SUMMARY

A system for a natural language human-machine interface specifically focusing on navigating to a web page using natural language representations of web addresses is disclosed herein.

According to one aspect, a system for accessing a webpage through natural language communication with a computer, an important example of a human-machine interface, comprises a registry database configured to store at least one table the table configured to store associations between a concept in a text string and all natural language variations of the text string and associated concept identifiers, the concept expressed in the text string and variations thereof relating to an object; and a parser interfaced with the database and configured to receive the text string or a variation thereof, the parser further configured to identify the concept represented by the text string or variation thereof and associate the identified concept with the object.

According to another aspect, a system for accessing a webpage through natural language communication with a computer comprises a registry database configured to store at least one table the table configured to store associations between a concept in a text string and all natural language variations of the text string and associated concept identifiers, the concept in the text string and variations thereof relating to a web address; a parser interfaced with the database and configured to receive the text string or a variation thereof, the parser further configured to identify the concept represented by the text string or variation thereof and associate the identified concept with the web address; a short tag processor configured to generate a short tag that is representative of the text string and associate the short tag with the concept; and a responder configured to provide the short tag when a long text variant is entered.

According to still another aspect, a system for accessing a webpage through natural language communication with a computer comprises a portal configured to receive a text string; a registry database configured to store at least one table the table configured to store associations between a concept in a text string and all natural language variations of the text string and associated concept identifiers, the concept in the text string and variations thereof relating to a web address; and a parser interfaced with the database and configured to receive the text string from the portal, the parser further configured to identify the concept represented by the text string or variation thereof and associate the identified concept with the web address.

These and other features, aspects, and embodiments of the invention are described below in the section entitled "Detailed Description."

BRIEF DESCRIPTION OF THE DRAWINGS

Features, aspects, and embodiments of the inventions are described in conjunction with the attached drawings, in which:

FIG. 1 is a screen shot illustrating an example of a M5 table that can be constructed in accordance with one embodiment;

FIG. 4 is a screen shot illustrating another example of a M5 table that can be constructed in accordance with one example embodiment;

FIG. 5 is a screen shot illustrating another example of a M5 table that can be constructed in accordance with one example embodiment;

FIG. 7 is a screen shot illustrating another example M5 database that can be constructed in accordance with one example embodiment;

FIG. 10 is a screen shot of the MicroMaven table that enables parsing of thousands of paraphrases of the text string "Show me how SAGE software inspires better business decisions";

FIG. 12 is a diagram illustrating a truth table that can be used to model complex concepts.

DETAILED DESCRIPTION

Figure 2:
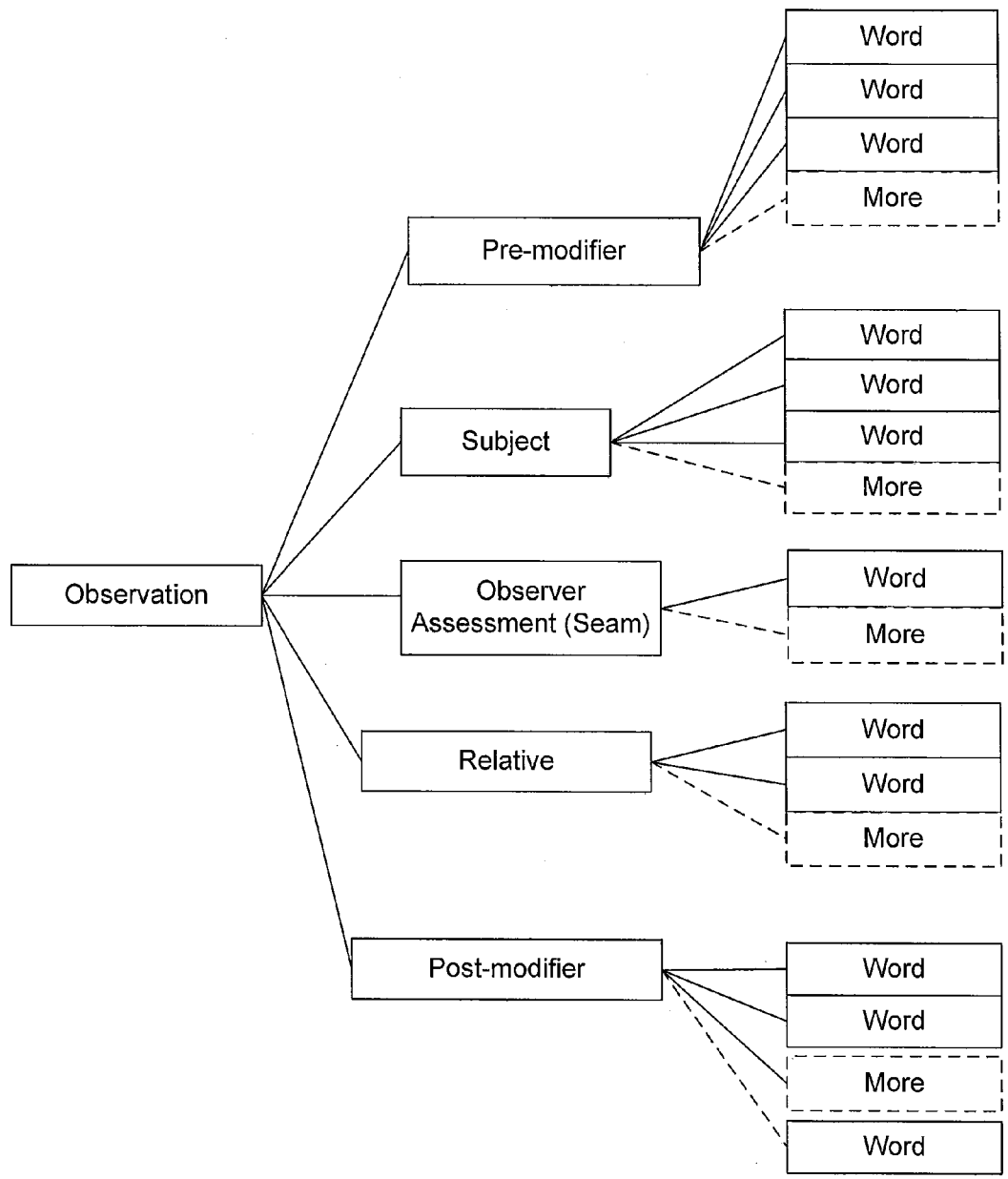
FIG. 2 is a tree diagram illustrating the structure of an observation concept that can be modeled using the table of FIG. 1.

The systems and methods described in the '199 application are able to construct the complex mental concepts encoded in language expressions but only in conjunction with a M5 database table. The M5 database is a table of equations containing symbols that represent clear mental concepts. Each row of the table defines a binary operation or equation that directs a computer program to convert two operand symbols representing mental concepts into a single symbol, representing a product mental concept. Each row contains an equation that makes a result concept equal to the product of the operation on two party concepts. This table enables a parser program to parse complex input text and determine precisely which mental concept it means.

The computer parser program described in the '199 application emulates the operations performed in the mind of a reader or listener by performing binary algebraic operations on symbol pairs represented by adjacent language elements of the text. Each computer operation combines two adjacent symbols and replaces them with a single symbol until there is only one symbol remaining, which stands for the meaning of the whole expression. Thus, it is important that the systems and methods described herein regard not only lexical words but also grammatical words and punctuation marks as symbols for mental concepts.

Access to a M5 database, or table symbolizing all of the specific mental operations encoded by a sensible language expression is required for the parser program to determine the meaning of that expression. The parser program uses a methodology similar to a calculator algorithm that uses Reverse Polish Notation (RPN) to evaluate the meaning of the text string without human supervision. This system enables a computer to parse sensible natural language inputs and obtain a single symbol that represents the meaning of the whole text The parser program parsing a particular text will find the precise database row in an M5 table that represents the complex concept encoded in that text. By tying appropriate programmed responses to that database row the computer can respond very appropriately to text inputs and so mimic a human mind to a high degree.

And, one can see that the same parser running backwards, i.e., consulting a Maven table, starting with the concept ID# of a final concept row, operating recursively on the two source concepts, recursively substituting two concepts for each one at each level of recursion, keeping the order of concepts and words throughout, will generate the original language expression. This process itself is "expression" of a concept. Expression, mapping a concept onto text, is useful because an M5 database can only communicate with a human by generating a language expression that the human can parse and understand to get at its meaning. When using a MicroMaven table that can field all the variant paraphrases that mean the same concept, as described herein, it is possible to generate a very large database of all of the thousands of these meaningful paraphrases.

Thus, in order for the systems and methods described in the '199 application to operate correctly, an associated M5 database must be created. The '199 application described several example methods for generating an M5 table; however, these methods can be time consuming when generating a large database. Accordingly, automated methods for generation of an M5 database that can reduce the time and complexity of creating the database are described below. But first, the structure of an M5 database as disclosed in the '199 application will be described here.

In the '199 application, the entries in an M5 database that model mental operations are referred to as join rows. As explained in the '199 application, a relatively small set of join rows can precisely specify the structure of a complex mental concept by defining how its component concepts are joined to each other. Each join creates a join product idea made up of the two subcomponent ideas. Just as a text can define the structure of a complex mental concept, this set of join rows represents a complex concept and defines its precise structure. An M5 join table is an alternate medium to text for holding the mental thoughts of an author. It matches the meaning of the original source text, or of unwritten thought. An M5 domain of knowledge contains many complex concepts each modeled by its own set of join rows. These sets of join rows are aggregated together into a table of join rows that models the whole domain of knowledge.

Thus, complex mental concepts specified by texts can be represented as a list or table of all legal joins between component concepts. In other words, a set of join rows describes and defines a data tree structure able to represent a complex mental concept, idea, or thought. In each join row, two concepts identified by their unique concept ID#s are indicated to join together to produce a product concept, identified by its unique concept ID#. Each such join is defined in a row in a database table. Each join row of the table can hold the ID#s of the concepts that are joined to form a compound product concept and also the ID# of the compound product concept thus formed. Each row can represent a concept as does the unique ID# of the concept. Thus these rows could be called joins or could be called concepts. Knowledge organized in this alternate fashion, in M5, has values and properties quite different from the same knowledge stored as text because a computer or processor can understand the relations between the concepts, understands the place of any concept in the knowledge base.

It is possible to represent an algebraic expression as an M5 table enabling the parser to evaluate that algebraic expression correctly. This underscores the equivalence of algebraic and language expressions and also the ability of M5 tables to capture the necessary order of precedence of binary operations.

To implement the join table, a new row or record is created in a database table for each individual idea, simple or complex. This row contains all the necessary information to uniquely identify the idea, specify its relationships with connected ideas, and can have a text field containing the language words, paraphrases, sentences, or paragraphs that language can use to identify and describe the idea or thought that the record represents.

Two important fields are the field that contains the ID#s of the two concepts that were joined to form the product concept, and the field that contains a concept ID# of the product concept. Other fields of the record can contain metadata useful for processing the table.

In certain embodiments, all joins that exist between the simple mental concepts can be listed first in the table. Then any joins between the product concepts of the first joins and still unjoined simple concepts. Then joins between pairs of compound concepts to form complex concepts can be added to the list. Then joins between complex concepts to form more complex concepts, and so on until the final join produces a single complex concept root node that represents the structured concept and all of its component concepts in their place. It is important that no illegal joins are listed in the join row table.

The purpose of the paragraph-sentence-line/order column is that it imposes a tree structure on the whole M5 knowledge domain, allowing concepts to take their place in the domain in a logical and convenient manner Like a language text, a domain of knowledge in M5 can be divided into numbered observation concepts and paragraph concepts, which are ordered in the manner of written text. So every join row can be marked by values in a special order field/column of the concept record as to which observation and paragraph concept that idea is party to. This proves useful when creating the database, for keeping concepts in an organized structure, and for sorting of the database table back into order or into some useful new order. It also provides a place for insertion of new concepts into the exact observation concepts and context where they apply. The order column is also important in enabling ancillary software programs to be aware of context, by searching the database for local concepts when settling on which concept, say, a personal pronoun is referring to. This is a powerful function for resolving ambiguity, allowing ancillary programs to operate at a truly human level in understanding text inputs.

The text field/column normally contains a text string that best describes the concept represented by that row. The content of a text field is identified and symbolized by the concept ID# in the concept field/column of the same row. These text strings are used to output programmed language texts to answer questions or make appropriate statements in a given context. This field can be a memo field that allows a large body of text to be output. Text fields can also contain hyperlinks to computer programs, files, graphics Web pages or other coding that could be interpreted by the computer to perform other actions or functions in its repertoire. When input text parses to a final single concept row it is usual for the computer to output the text or operate the hyperlink or perform other function coded in the text field. The set of text fields in a Maven table can be considered to be the "repertoire" of the computer Maven seen as a human-machine interface.

There can optionally be a row that lists concept ID#s of all the concepts that the concept of that row is a member of, necessary for the intersection method of parsing.

Accordingly, just as in the mind, a complex concept is composed of a large number of clear concepts related to each other precisely, i.e., the structures of concept ID#s are joined to concept ID#s to form more complex concept ID# constructions. Then concept ID#s of more complex concepts are joined to represent even more complex concepts. And so on recursively to finally represent a unitary complex concept construct that holds all of its component concepts in a particular structure.

FIG. 1 of the '199 application, which is presented here as FIG. 1, is a screenshot illustrating an exemplary M5 database table that enables a parsing program to derive the concept ID# DBHAN? from the input string question "Does Batman have a nemesis?" Thus, the example also illustrates a method of using acronyms or initialisms to create unique concept ID#s.

The above table rows or records form a tree structure for concept DBHAN? in the following way: the "Vocab" column of each row contains each lexical word or unit, a grammatical word, or punctuation mark of the input text. In this case, these elements are in rows 174-179. The Lookup field contains the pair of concepts that join to make up the concept represented by that row with the ~ representing the join symbol. The concept field contains the concept ID# of the concept. The response field contains the concept ID# of the row in the table that represents the response concept, in effect a pointer to that row. The text field contains the text that best describes the concept of the row.

It will be seen that the set of 11 rows, 174-186, define a tree. ? is a leaf node of the tree. Concept DBAN? is the product concept formed from combining concepts DBHAN and ?. Does is a leaf concept. DBHAN is the product concept formed from combining concepts Does and BHAN. BHAN is adjacent to Batman and HAN. Batman is a leaf concept. HAN is made up of Have and AN. Have is a lexical leaf concept. AN points to A and Nemesis. A is a grammatical leaf and nemesis a lexical leaf. This is a directed binary graph in Graph Theory. YTJ is a response concept, which can, e.g., cause an enable computer to output the text "Yes, The Joker."

Concept DBHAN? is represented in Fifth Medium by the tree defined by the set of the 11 rows 174-186, by row 186 alone and by concept ID# DBHAN? alone. Of course, the text string "Does Batman have a nemesis?" also represents this concept, but in Fourth Medium as described in the '199 application.

As can also be seen, join-rows can have a response field containing pointers to rows that represent actions computer is capable of taking. Row 187 is such a response row, pointed to from rows 185 and 186. It contains in its Text field the text "Yes, the Joker", which would be output when concept row 186 was found by parsing the input question "Does Batman have a nemesis?"

To enable the computer to perform appropriate programmed response to language inputs the table can comprise a response field/column, which can be empty or can contain one or a string of concept ID# symbols. When input text parses to a final single concept row, if the response field in empty the computer will execute what is in the text field, otherwise each concept ID# in the string in turn will act a pointer to another row in the table and trigger execution of the operation coded in the text field of the row pointed to. Certain rows are pure response rows with empty lookup field/columns and are available to service the response field/column of another row. Response can also be activated by a single word input if that word is placed in the vocab field/column of the same row. By inserting appropriate programmed responses in the response field/column the computer can respond very appropriately to text inputs and so mimic a human mind to a high degree. For example, one can open several carefully selected Web pages with one natural language instruction.

In the databases, each concept record or join row can have a unique ID# and pointers to ID#s of other conceptually related rows, which in turn have pointers to other conceptually related records, enabling a particular set of linked records to form a tree structure able to model collectively any particular human thought in all its detail. Such a tree is a graph, in particular an ordered binary tree of Graph Theory that respects all the principles and theorems of Graph Theory. Each join row of the Maven table can represent a node of the binary tree. It can be important that each non-leaf node is identified by a unique symbol or ID# so that joins of higher level concepts can be documented. Besides its ID#, each join row can contain the ID#s of the pair of mental concepts that were joined to make it, each represented by their own row in the database, as well as the set of ID#s of the more complex concepts that this concept is or can be a component of, again each represented by their own row in the database. Correspondingly, the operands and operators of an algebraic expression are leaf nodes of an ordered binary tree and there is an exact equivalence of methodology between parsing a language expression and evaluating an algebraic expression.

Each component row of the tree represents one of the subcomponent concepts that make up the complex concept. And the pointers specify that subconcept's exact place in the complex concept structure. This related set of rows in the database can model a complex mental concept in acute detail. For each such concept tree there is a root record that can stand in for its entire tree concept, whose unique ID# identifies and names the unique mental concept that that tree of records represents. Thereby, a complex concept can be represented in the database by this tree structure, or by a single row, or by an ID#.

Since human thought models (noun) entities, (verb) states, events, and actions and the (seam) relations between them and specifies the degree of their reality or existence or non-existence in the real present world around us or in some imaginary world, metadata fields can be added to the records to specify whether they represents something real in the present, past, or in the future or something imaginary, in the present, past, or in the future. Concept records have other fields containing specifiers of various other properties of the mental concept they represent, such as which media is host to the concept, whose mind it is being held in, or in what text corpus, whether written or audio, its concept type, and any other property useful for the computer program to make use of when processing it.

The '199 application goes on to describe various types of joins and various types of concepts that can be modeled in an M5 database. The description of one important concept, the observation concept, is included here.

An observation concept represents a state when the observer has time to examine a point in the real or imaginary world and then see what he sees, i.e., all of the ancillary concepts that are related there forming a recognizable sensory pattern. This is observer driven construction of a state observation concept.

An observation concept represents an event when it happens in front of an observer. The event drives construction of the observation concept in the observer's mind. The observer's attention is caught by sensory patterns, i.e., concepts, showing up. He may have a situation. He has to make sense of the pattern, via a sensing. He has to relate them to each other and to see if they can be composed into a recognizable pattern already known to him that may have meaning in a larger context. To be able to see untoward concept patterns, foresee problems, and start measures to avert them is a survival skill highly selected for in human evolution.

An observation concept represents an action when the observer/actor first imagines what he will see if he takes an action, takes the action, and realizes what he imagined. Here the observer drives the construction of the observation concept in his mind. An observation concept can also represent a process, a custom or a rule.

The core of every observation concept in the systems and methods described herein is a triad comprised of three main component concepts: a subject concept, a seam concept and a relative concept. Optionally there may be a pre-modifier concept(s), which are common, and a post-modifier concept(s), which are less common.

In an English finite sentence the word strings that name these three components are discrete, have hidden boundaries between them and appear in subject/seam/relative order as shown in FIG. 4 of the '199 application, which is recreated here as FIG. 2 and which shows the tree diagram of an observation complex. The order can be reversed for poetic effect in certain finite sentences. Finite sentences sometimes run up to 100 words yet they are still comprised of the same five standard building blocks: the triad concept: subjectseamrelative, plus one or more modifiers.

Here are some example finite sentences with strings split into these component parts:

He (subject) is (seam) a baker (relative)

Harry (subject) still has (seam) many good friends (relative)

He (subject) does (seam) bake good pastries (relative)

But (modifier) the accessible Dalai Lama, whose voice can be downloaded as a ring tone and who crisscrosses the globe with a populist message of compassion and kindness, (subject) is only (seam) a part of who he is (relative).

He (subject) is mostly, and radically, (seam) a private man (relative).

It's easy to forget, given the sensitivities that have been awakened in this country since 9/11, thrusting lifelong citizens under suspicion for having foreign-sounding names and subjecting visitors to the indignity of being fingerprinted, that (modifier) America (subject) was (seam) conceived in a spirit of openness, as a land where people could build new identities, grounded in the present and the future, not the past (relative).

In this last sentence the long pre-modifier expression is putting a very subtle spin on the main clause; however, creating the sets of M5 join rows that can define the structure of this modifier concept is straightforward. Then, once represented by single concept it can be joined in to the whole observation concept structure.

Detecting the mostly unmarked borders that separate these strings that describe the triad can sometimes tax even a human parser; however, no matter how convoluted the sentence, no matter how many subordinate clauses decorate these concepts, it is a simple task for a parser program that has the help of a join row table.

In parsing a finite sentence it is imperative that the parser, when about to read a sentence, knows that the parser will be apprised of a triad of subject, seam, and relative in that order. First a subject concept will be disclosed and this subject will be in a specified seam relation to a relative concept to be disclosed. Then other information about the observation can be added with comma separated pre- and post-modifier phrases, which parse to single concept ID#s.

In other words, the parser will be told the subject and then immediately told what kind of relation it will be plus the observer's assessment of that relation, and then told the relative. Next, other information about the observation can be added with comma separated pre-modifier and post-modifier phrases.

The subject and relative concepts of an observation can be quite complex in their own right and have to be pre-built and assigned a concept ID# up front, the same concept ID# that would be obtained by parsing the subject and relative text strings of the finite sentence.

Subject concepts are always entity concepts. Very long and recursive text strings are often used to describe subject concepts yet an M5 parser, with the help of an M5 join table, is able to parse the string to a single concept ID# of that expression no matter how long or convoluted the string is.

A seam concept is a specialized cluster of parameters encoded in every finite sentence that make the sentence a finite sentence. They define the relationship between the subject concept and the relative concept plus the observer's take on the "reality" of the relation. Seam concepts are specified in language by a specialized grammatical particle or a short string of specialized grammaticals, or a verb inflection, embedded in the finite sentence.

Language has several techniques for encoding seams in finite sentences, which have to be decoded by the second person: the seam concept can be included in the grammatical particles is, am, are, was, were, has, have, had, does, do, did, can, could, may, might, will, would, shall, should, must, dare, and used to. Has to can optionally be treated as one of these. These grammaticals carry the observer's reality stamp and the type of relation featured in this observation. Interestingly, there is no overlap of this group with the other elements of language except for will and can, which are also lexicals. For this reason they are excellent markers of the end of the subject phrase.

These special grammaticals carry the world parameter, which indicates whether the observer is seeing the relation between subject and relative in his real present world or in some imaginary or memory world. In English, the past is treated as a memory world. For example is and can indicate present real world, was and could memory world.

An affirmation/negation parameter: affirmative is default, or never concepts are used to indicate negation. Seam concepts can be modified by concepts like always, only, still, ever, forever, seldom, initially, and usually. Seam concepts can be constructed in exactly the same manner as other concept with join rows. For example:
was~not=wasnot
wasnot~always=wasnotalways
wasnot~still=wasnotstill
wasnot~ever=wasnotever In any case the text string of the seam will parse to a single seam concept ID#, which is used in join rows along with the subject and relative concepts to build an observation concept.

Then the observer-assessment parameter also defines which of the three types of relationship will apply in this observation, a BE, HAVE, or DO relationship. Let's define them: a BE relationship occurs when the relative is an adjective type complement or apposition type concept, to be joined to the subject concept to enrich it. A HAVE relationship occurs when the relative is a neighbor noun entity type concept. A DO relationship occurs when the relative is a verb phrase type concept.

The modality parameter: the seam concept also carries modality. Like do, modals can, will, may, shall, and always relate to a verb type relative. Does says the observer sees that the relation exists. Can says observer assesses it's reality as possible, may says there it's a probability, will says it's certain in the observer's mental computation, shall says the observer will make sure it's real, must says it's necessary.

Very often the seam is not found on one of the separate grammatical particles listed above but rather is encoded as the -s or -d inflection of the lexical verb in a predicate.

As well as giving the relation a quality of existence, existence "percolates" into to many of the accessory concepts of the observation concept. The subject concept becomes real and so do component concept used in the construction of the subject and verb concept.

The seam is the way language confers degrees of reality on states of being, events, and actions. The seam is how language confers degrees of reality on concepts and distinguishes reality from memory and the imagination.

Carrying reality, affirmation/negation, modality, voice, tense, aspect, finitivity, the seam is what makes a finite sentence a finite sentence.

There are three types of relative concepts, BE, HAVE, and DO types, which have their own characteristic features. They are concept-enriching concepts, which may be restrictive or non-restrictive.

Concept Enriching Concepts (BE type) are Complement concepts and Apposition concepts.

Neighbor (Noun) concepts (HAVE type): This type of relative concept is related to the subject concept by a have type seam. Interestingly, subject concepts are enriched by an entity relative via a have seam. Take the sentence "Jim has a son," which describes observation concept. Jim (subject) has (seam) a son (relative). A man who has a son is a parent. The added conceptual content he receives, the niche concept he gets from occupying the subject niche of this observation is the, a parent, apposition concept.

Verb Phrase concepts (DO type): The verb concept is the third type of relative concept. Subject concepts are enriched by a do seam relating a verb relative in a similar manner to enrichment by have seams relating a noun relative.

Pre- and post-modifiers, whose descriptor strings are set off by a comma in finite sentences, are used to provide important metadata, setting the context, background, circumstance, situation, milieu, environment, perspective, or framework of the observation. Some disclose who says, thinks, notices, or believes it. Some disclose under what conditions it is true. Others turn it into a quotation, a question, or an exclamation. They indicate how the observer sees or saw the relationship between the subject and the other concepts involved. It declares the newly formed complex concept and its parts to exist or not exist as the case may be; this quality of existence "percolates" into to many of the accessory concepts of the observation concept, its world, reality, and modality.

Language uses many wonderful and subtle means to frame observations. Modifiers come in all shapes and sizes but all can be managed by parsing their strings to a single concept ID# and making a join row join it to the observation concept. These modifier concepts add enormous versatility to an observation.

Figure 3:
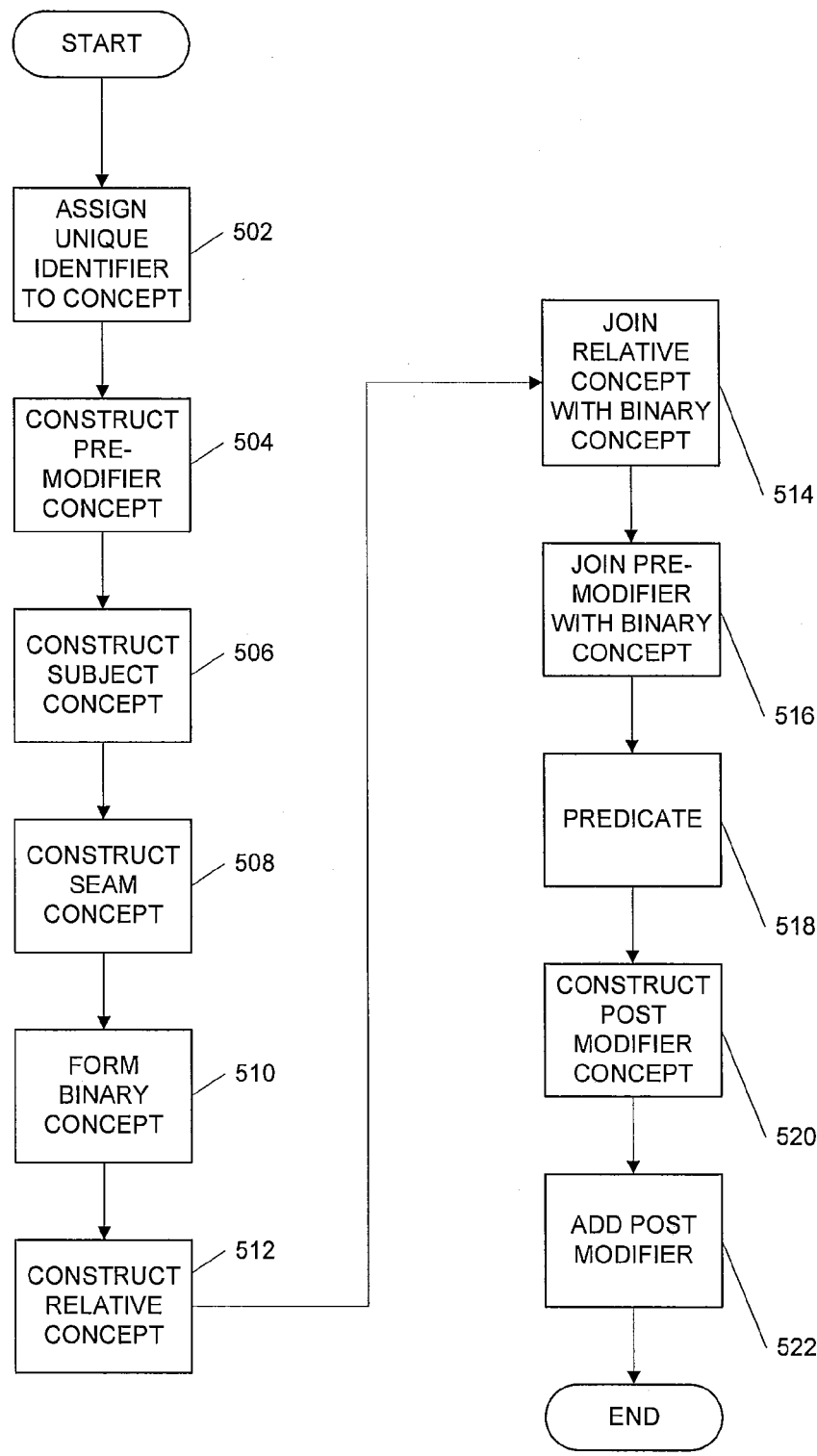
FIG. 3 is a flow chart illustrating an example method for parsing a text string using the table of FIG. 1 in accordance with one embodiment.

Generally, as explained in the '199 application, a composer who understands the meaning of sentences directs the process of building concepts in the database. An observation concept can be built in M5 with a series of join rows as described above. Triad concepts fall into three formal types and play standard roles in an observation. It makes sense that a finite sentence delivers them to the second person in an expected order. The seam source text is usually one to three grammatical particles. FIG. 5 of the '199 application, which is recreated here as FIG. 3, is a flow chart illustrating an example process for constructing an observation concept in accordance with our embodiment.

First, in step 502, a unique concept ID# can be assigned to the observation concept being built. This step can be performed up front at the beginning of the process. The ID# can stand for the complete and final meaning of the observation from the outset. In certain embodiments, the observation concept ID#s can be generated using a domain location numbering schema. But as mentioned, other schemes can be used as well.

In step 504, a pre-modifier concept, if present, can be constructed. For example, the pre-modifier concept can be built and assigned a concept ID# so it can in turn be joined into the overall observation concept with a single Type 3 join row. Pre-modifier concepts are extremely various and versatile as discussed in more detail above.

Next, the main triad of observation can be constructed by connecting together the three triad concepts with appropriate join rows. We have coined the term xxx for triad concepts that are directly joined to the point of the observation. Thus, the subject concept can be built in step 506 and the seam concept can be built in step 508. In step 510, the first join is between the subject concept and the seam concept can be performed in order to form a binary concept.

The next concept to be joined on to this binary concept is the relative concept, which can be built in step 512 and joined in step 514. Like the subject concept, the relative concept can be pre-built and given a concept ID# so it can be joined in to the observation with a single join TOW.

The predicate, step 518, is a special case. The lexical verb of a predicate already carries the entire seam parameter and the basic verb concept bundled together. In a predicate the lexical verb with a -S inflection indicates real world now, and with a -D inflection indicates real world then, memory or imaginary world. And it's always affirmative, with a DO parameter, never BE or HAVE. No join row is needed to bind in the seam concept in sentences that consist just of subject-predicate word strings.

The other special case is when the subject concept is plural and world is real world, i.e., present tense. In this case the seam concept is found in -s inflection of the subject lexical noun and not on the lexical verb as in a predicate. Curiously, in English, this same -s inflection has been pressed into use to indicate plurality in nouns generally. When world is memory or imaginary and number is plural the -s inflection remains on the subject noun along with a -d inflection on the lexical verb of the predicate.

The appropriate join rows to make these observation concepts are:
  Subject~verb-s=observation12 (singular-real world)
  Subject~verb-d=observation31 (singular-memory world)
  Subject-s~verb=observation44 (plural-real world)
  Subject-s verb-d=observation53 (plural-memory world)

Most finite sentences end here. However, some go in to add "a" after comma time, place, reason, or manner post-modifier phrase, step 522. These are very similar to the pre-modifier concepts. Again they should be pre-built, step 520, and have a concept ID# so they can be joined on to the observation with a single Type 3 join row.

All of the observation component concepts are encoded in the finite sentence by various natural language techniques. It is second nature for a literate second person to pick them off the text, to decode them. It is automatic. Our M5 composer must detect them and make sure they are added on to the observation correctly.

Translating a finite sentence, "At a most basic level, Richard Price's new book is a police procedural," into an observation concept.

First, observation concept ID # Observation32 is assigned to the observation, e.g., as this observation is being sourced from the second sentence of the third paragraph of the article. Observation32 is now the concept ID# of the whole sentence in this example.

An installer program can be configured to install the vocabulary rows into the database automatically.

Now, to pre-build the preceder concept (step 504) and the three core concepts of this observation (step 506-514): the installer constructs the preceder concept: "At a most basic level," e.g., producing concept ID# AAMBL. Next the subject phrase, "Richard Price's new book," becomes, e.g., subject concept RPNB. The seam concept is. Then, relative concept, e.g., APP is translated from the apposition phrase "a police procedural."

Now it takes just three more join rows to build the observation concept itself.
  AAMBL~Observation32=Observation32
Which joins pre-modifier AAMBL to the observation concept with the type 3 join TOW.
  RPNB~is =RPNBis
Which joins subject concept RPNB to the observer-assessment concept is with the Type 1 join row.
  RPNBis~APP=Observation32
Which joins concept RPNBis to the relative concept APP with a Type 1 join row to make the observation concept Observation32.

Now this set of vocabulary and join rows are sufficient to enable a parser to parse the complete sentence, "At a most basic level, Richard Price's new book is a police procedural," when it is, e.g., typed into the parser program.

One way to automate the construction of an M5 database disclosed in the '199 application is to use concept templates. The various types of complex concept described in the '199 application have standard structures, which can be represented by standard sets of join-rows. Such standard sets of join rows are the concept templates. In templates the standard component concepts are given generic concept ID#s, which can be replaced by the actual concept ID#s of the subconcepts of the new complex concept to build that complex concept in M5.

Figure 9:
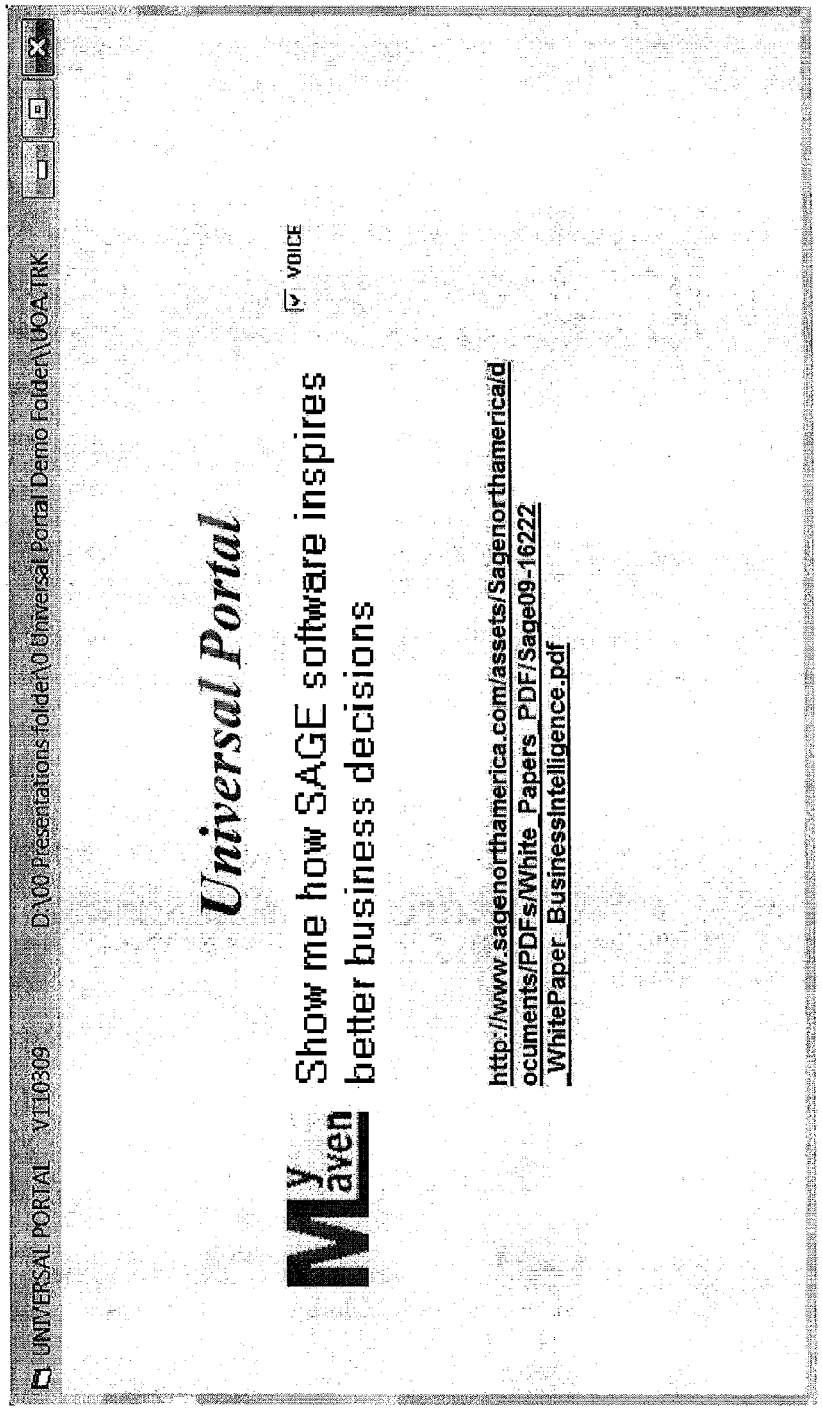
FIG. 9 is a screen shot of a Universal Portal into which text has been entered to obtain and display the appropriate URL, and open the corresponding Web page opens in a browser window.

FIG. 9 of the '199 application, which is recreated here as FIG. 4, shows the join rows of a functioning database template for an observation concept. Notice that the subcomponents of the observation Ob11 have been pre-assigned concept ID#s that reflect their position in the knowledge domain, i.e., S11 to the subject concept, V11 to the verb concept, and Orl1 to the observer reality assessment concept.

When translating a finite sentence into M5, it is necessary first to develop each parapoint word string as a concept with its own concept ID# by creating the necessary join rows in an M5 table. Then to edit that concept ID# to the concept number pre-assigned for that particular parapoint in its template join row. Then to add this set to the template set.

The resulting sum set of join rows models the observation sourced from the finite sentence and allows that finite sentence to be parsed completely and also to parse when, where, how, and why questions associated with that finite sentence.

It is possible to construct a concept template for an entire domain concept. An M5 knowledge domain translated from a scientific paper or an article of 2000 words will consist of about 100 observation concepts averaging 20 words per sentence. A few more accrue from subordinate clauses, which also represent observation concepts, used in the construction of the formal concepts. Each observation concept template can be built with a set of 20-30 join rows, more if its concepts are complex. Certain other sets of join-rows can be added such as those that disambiguate deictics or define the niche concepts and response concepts that are used by a parser to interrogate the M5 domain with how and why questions; as explained below. When all of these rows are present and correct, one can interact with or interrogate the M5 table via the parser program at the same level that one can interact with or interrogate another person with the same knowledge.

Another type of concept for which it is useful to have a pre-built concept template is the group concept. For example, to construct a group concept in M5 from the text "a king, a queen, and a beautiful princess." FIG. 10 of the '199 application, recreated here as FIG. 5, is the M5 group concept template database that can be used. This group concept template is constructed from source text "A, B, and C".

A parser program parsing input text "A, B, and C" against this template database finds its concept ID# and13 and outputs text "A, B, and C"

Figure 6:
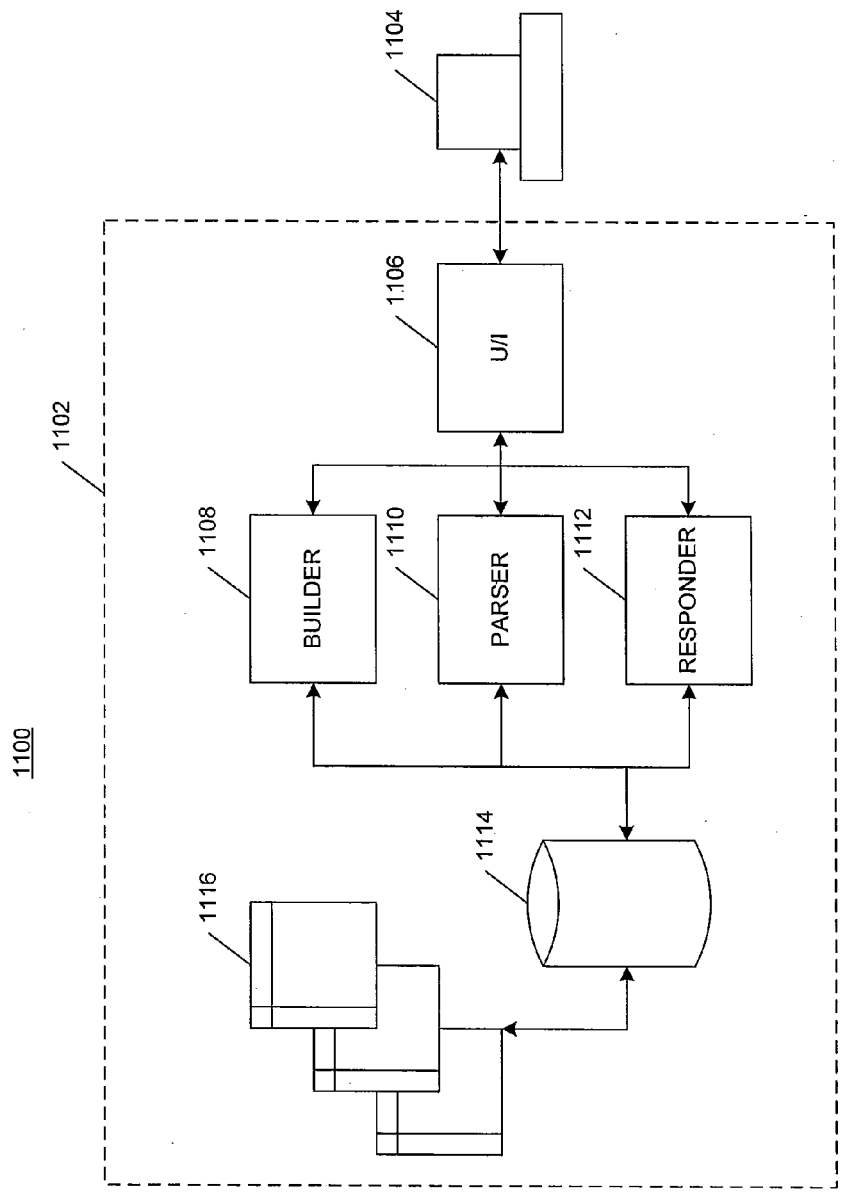
FIG. 6 is diagram illustrating an example system configured to construct and store the tables of FIGS. 1, 4, and 5 in accordance with one embodiment.

Here is an actual run of an example parser program:
QUESTION
A, B or C
ANSWER
A, B or C FIG. 11 of the '199 application, recreated here as FIG. 6, is a diagram illustrating an example system 1100 configured to carry out the processes described above. As can be seen, system 1100 includes the components of natural language processing system 1102 and a terminal 1104. Terminal 1104 can be used to interface with system 1102 and can for example be a laptop or desktop computer; a mobile computing device, such as a smartphone or palm computer; or any other type of computing device that can be configured to interface with system 1102.

System 1102 comprises a user interface 1106, which can be configured to interface system 1102 with terminal 1104; builder 1108; parser 1110; responder 1112; and storage 1114, which can be configured to store one or more tables 1116. User interface can, in certain embodiments, comprise text-to-speech processing (not shown), speech-to-text processing, or both.

Tables 1116 can comprise the data of various M5 databases formatted as described above. Builder 1108 can be configured to construct the tables in accordance with the rules and processes described herein. Once built, parser 1110 can be configured to parse text strings input through user interface 1106 using the tables in accordance with the rules and processes described herein, and responder 1112 can be configured to respond as instructed by responses stored in the tables.

It will be understood that system 1102 can be remote from terminal 1104 or can be included in terminal 1104. In general, system 1102 comprises the components, hardware and software, needed to implement the systems and methods described herein. The components comprising system 1102 can be co-located or distributed across multiple hardware platforms. For example, some or all of builder 1108, parser 1110, and responder 1112 can be implemented on one or more servers or computers, which may also be configured to store tables 1116. In other embodiments, tables 116 can be stored remotely form the other components. Similarly, user interface 1106 can be co-located or remote from the other components.

It will be understood that the components illustrated in FIG. 6 do not necessarily depict all of the necessary components, nor is the arrangement illustrated intended to convey the need for a particular infrastructure. Rather, the components and arrangement illustrated are by way of example only.

Builder 1108 can be used to construct tables 1116, i.e., to build an M5 database. In this case, an input text string is used to drive the construction of a database table able to model each concept structure that each text string names. For example, using the same x,y grid, words and punctuation marks of the input text string can be copied ascending into the cells of column 1 as before. Now, instead of searching the table for joins of concept numbers the joins constructed using builder 1108. In other words, builder 1108 can be used to indicate which particular adjacent concepts make a legal join.

In certain embodiments, a mouse-drag can be used to drag a concept up or down the column and to drop it onto another. A unique product concept ID# of the join is generated and posted to a cell in the next column in the same row as the "surviving concept". A corresponding new join row defining the two component concepts and the product concept and documenting this join is added to the table. Concepts not involved on joins are posted as is to the next column. In this manner, the content of the grid filled out by actions of the composer using builder 1108 is identical to the content of the grid filled out by the parser program. Such a drag and drop process can, however, be time consuming.

Every concept can be assigned a unique concept ID that ideally needs to be generated automatically by builder 1108, though they can also be created and installed and edited manually in the table. Ideas need only be given unique numbers. The systems and methods described herein will work if these unique ID numbers are generated of example by a random number generating program or using a next accession #; however, it can be preferable to employ a methodology where the numbers generated have some meaning accessible to the administrator or user.

Thus, in certain embodiments, nearly all words, punctuation marks, prefixes, suffixes, and inflections are their own concept numbers. This can be done programmatically or by lookup table. There are occasions when it is useful to assign the same concept ID# to two different words if they are perfect synonyms in a particular context. For example it has been found useful to give both words "an" and "a" concept ID# a.

One method of generating unique concept ID#s from strings of words and punctuation marks is to concatenate upper case initials and punctuation marks of the preferred language phrase that describes the concept. For example, builder 1108 can be configured to generate the product concept number of a join of two words by concatenating upper case initials of the two words to form an acronym, initialism or alphabetism, that becomes the concept ID# of the word string. For example the product concept obtained by joining concept green to concept tree would be concept GT. Since GT is still tree enriched by green it is the surviving concept, GT is posted to the row of tree not of green in the concept building grid. When two upper case initialisms are joined, they can simply be concatenated. When a word concept is joined to an initialism, the initial of the word can be concatenated with the initialism.

Under this system of concept ID# generation, the concept ID# of any string will in most cases be the initialism made up of upper case initials of the entire string in same order. This is the basis of a very simple algorithm to generate the concept ID# of a string; however, this simple, quick methodology is not generally useful because the information as to where the joins occurred is lost, and the table of joins essential for parsing an unknown string will not be built. A simple, quick methodology for dealing with this issue will be described below.

Another important method of generating concept ID#s is to use locations in the domain as concept ID#s; however, any schema that generates unique concept ID#s will work with parser 1110.

It is also possible to model each clear idea or concept as a software object, employing object oriented programming, as an alternative to representing one as a database record. One can capture the properties of the concept, its relationships and make use of inheritance to enrich concepts.

Such an implementation, new information can be added in the form of a website, able to serve the application to as many people at the same time as the hardware can manage. For example, built on entirely free and open source software, a Linux server, using a Java application server Tomcat, and a MySQL database, such an embodiment can allow multiple people to work on the same "knowledge domain" or different people to work on different knowledge domains, or two or more people to work together on one knowledge domain. You can create an empty knowledge domain, and add users or edit a user's profile and add knowledge domains that they are allowed to read or read and modify.

In such implementations, database 1116 can be constructed of 3 main tables, each of them dealing with concepts and the interrelations between concepts. In this version, each concept can be instantiated, e.g., as a java.lang.Object, the class from which it descends. In a single inheritance class hierarchy (called glace.*), there are 9 different classes of Concept, each of them deriving originally from glace.Concept.

The concept types can be: Unknown, SimpleLexical, Motor, CompoundLexical, Complex, SeamMember, Seam, Look, See, Observation, and Schema. And each of them can be constructed from a main concept table, with many associate tables joined in. These 9 types of concept increase in complexity, and share common "components" of which there are quite a number. The specifics of these components make up the properties of the concept, and determine their complexity.

The collection of objects, stored in the database, can be located anywhere on the Internet, and queried by any parser 1110 allowed to access it. Web services can be configured to receive either inputs or outputs between ks, and XML documents describing Concepts and groups of Concepts can be passed between knowledge domains, for adding, modifying, enriching, or querying concepts. In this way, 2 or more independent knowledge domains can be combined to cover a domain of knowledge deeper than any single knowledge domain can.

As noted in the '199 application, translating language into an M5 database format is akin to a writer writing well. The systems and methods described in the '513 application are designed to help make this process easier and more automated. These methods are based on the concept that the chief operation of the mind is a binary operation that replaces two concepts with a single product concept. All three of the language elements, lexical words, grammaticals, and punctuation marks, are treated as symbols that stand for mental concepts. Algebraic expressions specify a series of binary algebraic operations that replace two adjacent operands and an adjacent operator with a single product operand. Similarly, in the systems and methods described herein, language expressions specify a series of binary mental operations that replace two adjacent concepts and the implicit mental operator with one product concept.

With this in mind, operator symbols can be appropriately placed in the text in a word processor, employing the principles of postfix Reverse Polish Notation (RPN). A builder program 1108 can then be configured to automatically construct a M5 table from the marked up text. In other words, by defining the precedence with which concepts are combined, the operations that must be performed on a string of text can be made clear such that generation of an M5 database can be automated. A detailed description of the systems and methods related to automatic M5 database creation described in the '513 application are not presented here for the sake of brevity; however, reference can be made to the '513 application for a detailed description.

Using the systems and methods described in the '199 and 513 human-machine applications of all sorts, can be designed and built that take advantage of the ability to speak, or type text into a computer in natural language and have the computer understand the text and respond appropriately. Language, a vast combinatorial system, is a powerful method of precisely identifying a particular concept out of trillions, perhaps best described by Steven Pinker:

"The fact that grammar is a discrete combinatorial system has two important consequences. The first is the sheer vastness of language. Go into the Library of Congress and pick a sentence at random from any volume, and chances are you would fail to find an exact repetition no matter how long you continued to search. Estimates of the number of sentences that an ordinary person is capable of producing are breathtaking. If a speaker is interrupted at a random point in a sentence, there are on average about ten different words that could be inserted at that point to continue the sentence in a grammatical and meaningful way. (At some points in. a sentence, only one word can be inserted, and at others, there is a choice from among thousands; ten is the average.) Let's assume that a person is capable of producing sentences up to twenty words long. Therefore the number of sentences that a speaker can deal with in principle is at least 1020 (a one with twenty zeros after it, or a hundred million trillion). At a rate of five seconds a sentence, a person would need a childhood of about a hundred trillion years (with no time for eating or sleeping) to memorize them all." Steven Pinker, The Language Instinct, p. 85-6.

Language has the ability to precisely express a virtually infinite number of complex concepts. But, surprisingly, it is also possible to say exactly the same thing, to express the very same concept, in billions of different ways. Pronouns, synonyms, epithets, paraphrases, synecdoche, metaphors, etc., are all commonly used in sentences to express the same concept. One can use active or passive voice and the order of words and phrases can often be changed without altering the meaning of the text input. In one study described below using the systems and methods described herein, it was demonstrated that a particular 24 word legal statute could be worded in tens of billions of different ways and still accurately state the law. It was shown that a parser as described herein can be programmed to recognize all of the billions of wordings that reflected the law precisely and reject all of the billions of variants that did not.

This is because such a parser is able to parse small or large text inputs and recognize particular passages in the input text that have an expected meaning if it is a concept registered in the parser's table of concepts. The parser can detect registered concepts in text no matter how they are phrased. The ability to recognize complex concepts in text no matter how they are phrased has many applications in the management of the unstructured and semi-structured information stored in text.

It is a feature of natural language that the same concept can be expressed precisely in millions of ways, i.e. with millions of different language expressions that mean the same thing. Therefore, it can be beneficial to configure MicroMavens so they are capable of fielding all variant wording of an expression that clearly describes a "concept" to identify which registered concept it means.

Thus, in certain embodiments, a parser can translate to a single end concept any unbroken string with specific meaning formed solely from vocabulary words and expressing concepts registered in the database. If a string has the same meaning as the end concept, then it will translate to that concept. Words, phrases and concepts not registered in the database are ignored.

First, to build a MicroMaven table that allows fielding many text variants, the table should contain a vocabulary row for each and every synonym that might or could be used in a paraphrase. A thesaurus generally suggests up to ten synonyms for any word entered; however, in a given context only some of them are apt, others have baggage that makes them inappropriate. It is possible to allow just those synonyms that apply in a given context to be recognized. In the vocabulary row created for each synonym each synonym is mapped onto the same word, which becomes the common symbol for that synonym. Such vocabulary rows allow a chosen appropriate word or symbol to be substituted for the synonyms that may be used in a paraphrase. This can result in a great reduction in the number of rows needed in a MicroMaven.

Second, adjacent sets of words should be grouped into phrases, noun phrases, verb phrases, prepositional phrases, etc., which will combine in order in binary fashion to form higher order concepts. Just as synonyms refer to the same concept, each of these intermediary concepts can be paraphrased in several ways with different word strings. These higher order concepts in turn combine in binary fashion to from even higher order intermediary concepts which in turn combine in order in a tree structure as shown in FIG. 10. Ultimately there is one unitary concept that represents the meaning of the whole expression.

The best way to explicate this is with an example. The SAGE software company has posted a white paper in PDF format on the Internet about how their ERP software can inspire better business decisions. Currently, SAGE print advertisements tell you to go to Web address: http://www.sagenorthamerica.com/visibility, to download the white paper. After typing that URL into a browser one still has to navigate to the white paper to download it. To obtain the download directly users would have to type in the following URL: http://www.sagenorthamerica.com/assets/Sagenorthamerica/documents/PDFs/White_Papers_PDF/Sage09-16222_WhitePaper_BusinessIntelligence.pdf.

If the SAGE white paper is registered as an object in a Maven registry, then the following suggested free text link (FTL) can be placed in their print ads:

GoDirect: "Show me how Sage software inspires better business decisions"

The systems and methods described herein allow users to enter a request for this paper in their own words and get the document downloaded onto their computer. This would make the white paper accessible in a much more natural way than typing in a long URL.

This requires creating a MicroMaven table in a database according to the methods described herein to make sure the parser can understand the meaning of any meaningful input text no matter how worded.

Accordingly, a language expression like "Show me how Sage software inspire better business decisions" can be treated as a series of language elements that group into e.g., four phrases expressing four higher order concepts as follows.

| Concept A | Concept B | Concept C | Concept D |
|---|---|---|---|
| Show me how | Sage ERP software | inspires | better business decisions |

Each of the above four phrases expressing concepts A, B, C and D can be paraphrased in many ways. For example, say there are eight ways to say "show me how" (concept A), five ways to say Sage ERP software (concept B), seven ways to say "inspires", (concept C) and six ways to say "better business decisions" (concept D). A string of phrases where several alternative phrases can be substituted for each one is a tuple in mathematical terms and the number of possible instances as calculated above is its Cartesian Product. If combinations of all these variations of A B C and D concepts are used to generate the message there would be 8×5×7×6=1680 variant texts that are clear requests for the SAGE white paper. In fact, there are more paraphrases for each of these concepts which would makes the number of possible variant clear text requests exponentially higher. And, change the order of B and C and D and the number of paraphrases is greatly expanded again.

Figure 11:
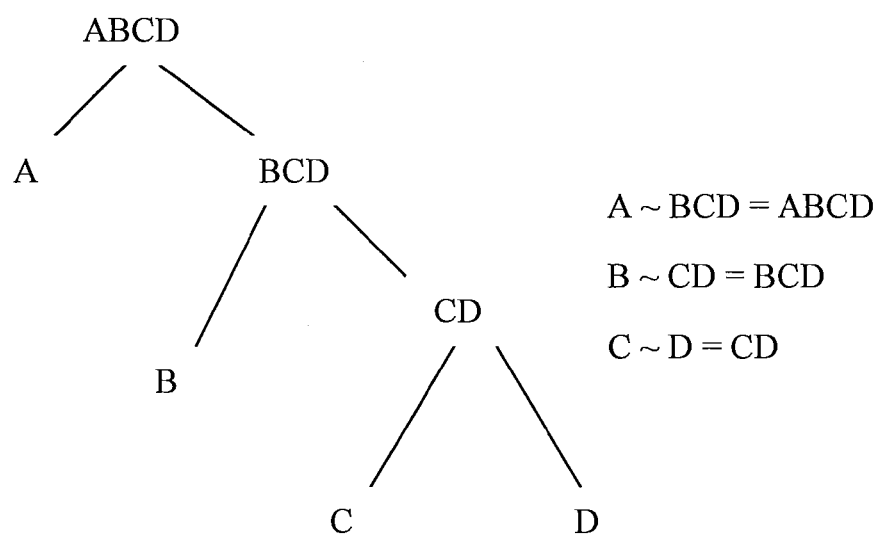
FIG. 11 is a diagram of a binary tree that illustrates three Maven join rows that connect four concepts.

Most human-machine interface instructions or questions are composed of four such higher order concepts or less. Thus, every longer string of language elements divides naturally into a short series of phrases that parse to unitary intermediary concepts that then combine in order, to form the single complex concept expressed by the entire word string. FIG. 11 shows the binary tree that illustrates and the three Maven join rows that connect the four concepts.

Thus, a bullet proof MicroMaven can be constructed by approaching each intermediary concept separately, making sure that M5 rows for all the vocabulary words and all concept pair rows that might be employed to build each intermediary concept separately are included in the M5 table. Then editing the table to make sure the end concept that all paraphrases, i.e. versions of the same intermediary text string that mean the same, parse to the same concept symbol or ID#.

The subset of join rows to parse each phrase is small. The number of rows in the MicroMaven is the sum of these four subsets. The number of expressions that can be fielded, however, is the product of these subsets. A human-machine interface technology implemented in this manner ensures that the machine will understand which procedure in its repertoire is meant no matter how worded.

FIG. 9 is a screen shot illustrating an example implementation of a portal into which an FTL can be input.

FIG. 10 illustrates a SAGE MicroMaven table constructed using the methods described, i.e., by composing a separate small join table for each higher order concept. This method resulted in a very compact MicroMaven table that can field a great majority of the many thousands of variant text requests that might be entered to request this specific PDF document from SAGE. The addition of relatively few more rows to the SAGE MicroMaven table would greatly expand the number of interpretable variant expressions.

Separately, to show that the method of fielding extremely large numbers of versions of an expression works in practice, a MicroMaven of just 463 database rows was built that can field 100 billion variant expressions that can correctly state California DMV Law Section 27360: "A child must be strapped in a approved child safety seat in the back seat if he or she is not 6 years old and is not 60 pounds" and reject all incorrect or imprecise statements of that law.

It was determined that the California Motor Vehicle statute could be captured in a small truth table of six concepts: notA, A, notB, B, Yes, No. where:

a child 6 years old or more=A
a child less than 6 years old=notA
a child 60 pounds or more=B
a child less than 60 pounds=notB
a child must be secured in a child safety seat=Yes
a child does not have to be secured in a child safety seat=No Each row in this M5 table of mental operations is an equation that models a mental operation that the mind must be able to perform to test whether the truth table is satisfied. Now the task of parsing for the billions of variants becomes vastly easier. Thus, it was relatively easy to build an M5 table of equations that fielded many billions of variant text strings that meant the statute and exclude ones that did not. And because the found concepts can be run through against the truth table, an exquisite sensitivity to subtle logic errors that were mind-twisting for a human to sort out can be built into the Micro-Maven. This truth table can also be represented by the four rows in an M5 table as illustrated in FIG. 12.

It is possible to take advantage of this feature of language, the fact that language is a vast combinatorial system. In the '513 application two applications were described as examples of the value of the method which has uses in many other contexts. The first example application was a computer interface whereby complex instructions can be given to the computer in natural language and understood perfectly by the computer to perform certain functions. This and similar applications will be discussed in more detail in the description that follows.

A MicroMaven can also be configured, or serve as a registry. Registries are bounded collections of objects of special interest to clients of its managing institution. Various institutions have established registries where objects are formally assigned identification numbers. Any formal managed list of objects is a registry. Registry collections are purposed to create and manage collections of objects. Objects can be of any kind: people, products, documents, books, Web pages, companies, telephone numbers, and so on, of interest and useful to particular constituents. Here are examples of widely used registries: UPC barcodes, social security numbers, SKUs, White Pages, NASDAQ companies, the DOI-ISBN systems for books and other objects, Amazon's Amazon Stock Identification Number (ASIN). In particular, the set of URLs, the addresses of all the Web pages on the Internet, is a registry.

Current registries provide discrete identity for objects by giving each object a unique identification number (ID#), allow access, aggregate metadata about the object in one place, and facilitate management of inventories by enabling lists of ID#s, and other useful purposes. Generally the managing institution is responsible for the maintenance and integrity of the database that hosts the registry and makes it available via the Web or other computer access or by physical distribution of electronic or printed media. Such registries are managed by the institution to service their various clients according to set rules and procedures. For example, duplicate identifiers are usually not permitted for a given registered object.

Using a registry to find a registered item requires some input action by end users. Once an object is accessed there will typically be a response, whether it be presentation of particular information or performance of some specific action. In these cases a response to each input request is built into the registered object.

Registries can be thought of in a more general sense: for example, an FAQ is a registry of questions; a menu is a registry of items available to be served by a restaurant. In this regard the system described herein can be considered a human-machine interface where the objects registered comprise a repertoire of the tasks or procedures that a machine can perform.

A novel kind of registry is presented in accordance with the systems and methods described herein. Such a registry can be realized in computer server databases, where each registered object is assigned a unique natural language identifier as well as the usual ID and barcode number. Such a registry can be considered to be a general purpose human-machine interface. In order for all meaningful text input variants no matter how worded to be able to describe the object clearly each object is linked to a MicroMaven, defined as a Maven parser matched to a unique table of database rows. In this manner each object can be considered to be tagged with a unique identifying "concept" whose meaning stays the same, but yet can be precisely named by any one of the thousands of different text expression variants that name it clearly.

Such a registry can be administered by a host organization that allows individuals and institutions to register objects of various kinds, each object identified by a text expression and all same meaning variants that describe the object clearly. Clients who desire to register objects contract with this registry administrator for slots in the registry; however, the registering organization supervising the registration procedure can also be responsible for creating MicroMavens that can identify registered objects, managing the MicroMaven database, and deploying the Maven parsing program against these MicroMavens to interpret users' text inputs.

With a Maven registry, every registered object can be accessed with any meaningful expression no matter how worded clearly describes the object. To find an item in a Maven registry, the end-user types or speaks in their own words a text input describing the item. If the input text describes the item clearly the Maven parser, using proprietary Maven parsing technology, will parse the input text expression, determine which object they seek and provide access to it.

MicroMaven access technology can also be added to current extant registries to improve their usability. The advantage that Maven technology brings to a registry is to make it possible for users to access any registered object by inputting in their own words a meaningful text string that describes the object clearly, a procedure that comes naturally to people. Thus, a much more convenient and user friendly class of registry can be provided.

A MicroMaven registry does not only assign a unique ID# for each object but also creates and assigns a unique Micro-Maven database table that enables the Maven parser to identify meaningful input text variants.

In addition to a registry of a subset of web pages, another example of a human-machine interface configured in accordance with the systems and methods described herein is a voice control system for automobiles. These systems are becoming more prevalent, vis; Ford's Sync system, controlling navigation, entertainment, telephone, etc. At present several hundred commands have to be memorized and spoken exactly. Some commands have one to two alternative paraphrases that will work. A registry or repertoire of voice commands can be configured as a MicroMaven so they can be given in natural language to obtain each desired function, with driver or passenger speaking any one of thousands of clear text variants for each one. As long as order is clear the computer Maven will understand which function they want and carry it out.

The description that follows is related to accessing web pages using a customized addressing technique or methodology. Google, for example, has a facility like this that aims to provide the one right response to a search entry, as described in Wikipedia: "Google's homepage includes a button labeled "I'm Feeling Lucky". When a user clicks on the button the user will be taken directly to the first search result, bypassing the search engine results page. The thought is that if a user is "feeling lucky", the search engine will return the perfect match the first time without having to page through the search results. According to a study by Tom Chavez of "Rapt", this feature costs Google $110 million a year as 1% of all searches use this feature and bypass all advertising"

In the spirit of "I'm Feeling Lucky", a "Universal Portal" is disclosed herein for use on computer screens or smartphones where users can input free text such as a request, instruction, order, question comment, or other message. A goal of the Universal Portal is to provide direct access to any Web page address on the Internet registered with the Universal Portal host company, removing the need to ever visit the home page of the Web site it is on and navigate to it or type in a URL into the address bar of a browser. An important property of the Universal Portal is that it can be a standard fixture on the main screen of a majority of computers and smartphones, ready for text input without having to navigate to it. Such a Universal Portal can be integrated into a browser application, popular search engine web page, social networking site like Twitter or FaceBook, or even an operating system like Microsoft Windows 7. There are several current text input fields like the browser address bar (location bar or URL bar) or the Google search box that could function as Universal Portal without interfering with their present functions.

Thus, the current URL in print ads can be accompanied or replaced by a free text message that describes the Web page will be printed in the ad. If this suggested text or a free variant of it (FTL) is entered into the Universal Portal, the Web page that it describes will, e.g., open in a browser window. The FTL would be printed in a box with a logo like:

GoDirect: "Show me today's Whole Food's specials"

It is expected that the required user procedure and the logo would become well known and indicate to consumers that the Web page in question is registered with the Universal Portal and can be reached directly by entering the FTL or any variant meaningful paraphrase into the Universal Portal.

All text entered would be processed by a parser program to see if a known registered concept is expressed in the text. To be recognized by the parser a text input has to make sense and be registered, i.e., be one of the concepts encoded in the M5 table of operations of the parser program. The parser can intercept only registered concepts, which are actionable and pertinent. These very specific "filters" or "interceptors" can be transparent to regular search entries and not interfere in any way with the regular function of the browser or search engine. They can ignore search criteria composed of ordinary key words and text with other meanings, and so can be seamlessly employed on the front end of search engines or smartphones.

As a further enhancement of this application, and of all human-machine applications, once an expression has been received, recognized and acted upon by the user, a short "tag" of several characters will be provided, which can be used later to send the same long message again, like a code, shortcut or password for this message alone. Tags can be generated and offered to the user, or solicited. Tags, short character strings, can be edited by the user so they can be more easily remembered. If a user cannot remember a tag, he just need enter any understandable version of the original long message again to obtain the response and be reminded of the tag; however, users who repeatedly go to the same Web page e.g. "my Wells Fargo Online account" (WFA) would be expected to memorize the tag and enter it rather than the longer FTL. The tag can routinely be the first part of each acknowledgement and response to reinforce user memory. Tags can be managed in cookies placed on the user's computer(s) so that they can be private to that user and only work from a computer or smartphone in the purview of the user. This allows the same short tag to be used by many different users for different messages without interference.

EXAMPLES

| | |
|---|---|
| "Please place a phone call to Wall Street Journal subscriptions" | tag: "WSJtel" |
| "Please call my Visa Customer Service" | tag: "VCS" |
| "Picasso Las Vegas, make dinner reservations for two tonight at 6.30" | tag: "PLV2dt630" |
| "Run Microsoft Word" | tag: "word" |
| "Show me my email" | tag: "mail" |

All messages or short tags can be input into the same portal resident on the desktop whether directed to one's own computer or to any website on the internet. Providing access to thousands of favorite links is an alternate form of the standard "favorites" function available on PCs, and very convenient because of the tag reminder feature. If the user has forgotten the tag he can just type in the request in his own words and it will be recognized and the user will be reminded of the tag provided for use the next time.

Businesses may be interested in owning particular messages and tags, e.g., as trademarked properties that would take users directly to their web site in the mode of "I'm Feeling Lucky." Users could directly order particular products or services as an immediate result of text entry without further navigation from a business if they were built into the Internet repertoire of the business. Placing a cookie, with the user's email, billing info, etc., on the user's computer to register the user with the business would allow them to provide very personalized service. For example, Google could register consenting FTL users, putting email, shipping address and credit card information in a cookie like Amazon does to facilitate online purchases. Because of vast combinatorial nature of language, billions of these properties can be created without interference with each other. Search engines can generate a new source of revenues by creating and selling these messages to businesses and vendors.

Such an application has the ability to change online advertising. For example, online advertising is encroaching on advertising in the traditional media, newspapers, magazines and catalogs, billboards, and product packages as well as radio and TV commercials. The web pages of Internet containing information of all kinds now viewed by billions of interested users for hours every day, has become an enormous and rapidly growing billboard where very effective and economical advertisements can be placed.

And, traditional print, radio and TV, billboard and product box advertisers have embraced the Internet in that 95% of print advertisements and most radio and TV commercials now carry a web address that provides more information in depth about the product or service being advertised; however, web addresses or URLs in such advertisements are awkward to use, remember, or both. One has to type in an HTTP Web address, which can often be very long, in letter-perfect fashion. As a result, a user is often frustrated in his attempt to reach a web page seen in a print or other traditional media, because the user either doesn't exactly remember or is mistyping the web address. In recognition of this problem, advertisers will sometimes use a shorter web address or URL in their advertisements; however, a short URL typically takes the user to the advertiser's home page and the user has to navigate from there.

Maven technology can be used to make it easy for customers to get to Web pages that amplify the print ad without having to remember and text in long Web addresses, or navigate Google to the Web page the advertiser wants them to see. And at the same time provide a new Internet product on the scale of AdWords for the host company of the Universal Portal. Such a portal can be built around Free-text-Links (FTLs) that can be used to access a specific web page, e.g., associated with a print or television add.

The number of concepts that language can mean with very few words is virtually infinite. Thus, there will never be a shortage of FTLs or problems with contention that is not easily dealt with. In other words, there are many variant paraphrases can precisely state the same concept. Easily composed FTLs can be defined that are human machine interface instructions that can be very specific. Mavens can be built to recognize almost any same meaning variant, at least all the ones most likely to be used, even very long ones.

M5 technology can then be used to obtain the concept in text, e.g., the concept ID# of any registered FTL that is input into the Universal Portal no matter how it is worded. The FTL can be embedded in a, e.g., print add instead of a traditional URL. When users read the suggested text, i.e., FTL, in, e.g., a text-link box in an advertisement they need only remember the concept not the actual words. Because even if they do not type the exact FTL into the Universal Portal on their computer, the associated parser, or Maven will still decode it properly and direct them to the correct page. Thus, the user can enter any fairly accurate paraphrase of the suggested text and M5 technology will recognize the concept and navigate to the Web page desired, which is important because it may be quite sometime before the user gets to a computer after seeing the advertisement, e.g., in the newspaper or magazine.

In addition to print, television and radio advertisers, catalogs are another group of print advertisers who could make buying easier by taking customers right to checkout for the SKU. Virtually all product packages such as cereal boxes now include a URL for a company Web page where complaints may be lodged or more information on the product obtained.

More specifically, a generalized human-machine interface where inputs in natural language are understood and responded to appropriately by a machine, such as a computer is disclosed herein. The example application described in detail is a Universal Portal entry field, e.g., present on Web browsers, but the methods described herein can be applied to human-machine interfaces of all kinds.

Web pages containing information of all kinds are viewed by hundreds of millions of interested users for hours every day. The Internet has become an enormous and rapidly growing billboard where very effective and economical advertisements can be placed. This trend in advertising has become a game changer for traditional media, newspapers, magazines and catalogs, billboards, radio and TV, as online advertising is encroaching on their advertising revenues. In response, as noted above, traditional print, radio and TV advertisers have embraced the Internet in that 95% of print advertisements and most radio and TV commercials now carry a web address that provides more information in depth about the product or service being advertised; however, e.g., for the reasons noted above, web addresses or URLs in such advertisements are awkward to use, remember, or both.

In accordance with the systems and methods described herein, print advertisements carry suggested free text that when entered into a Universal Portal will directly open Web pages. All text entered into the Universal Portal is processed by a M5 parser program (described above) to see if a known registered concept is expressed in that text.

Maven technology makes it easy for customers to get to Web pages that amplify, e.g., a print ad without having to remember and text in long Web addresses, or navigate Google to the Web page the advertiser wants them to see.

In concept, the Universal Portal is somewhat similar to Google's "I'm Feeling Lucky" feature; however, the "I'm Feeling Lucky" feature fails to find the desired page much of the time. Conversely, an entry in a Universal Portal will reach a registered Web page first time, every time.

Accessing a particular Web page with a natural language entry, as described herein, is much more natural than entering a URL into the address bar, or searching with selected key words and navigating to the same Web page. Web addresses or URLs in advertisements are awkward to use. One has to copy into a browser in letter-perfect fashion the http Web address, which can often be very long. For this reason compact URLs, often owned by big companies like www.ge.com are highly prized, but typically take you to a home page from which you have to navigate. "I think at the end of the day, people would rather Ask something than Google it". Doug Leeds, President of Ask.com.

The unmanageability of entering long Web page addresses is underscored by the success of URL shortening services like bit.ly.com. With this service, the user can enter a long URL and the service will return a shortened URL that is easier to use. When the user enters the short URL into the web browser, the browser is first directed to bit.ly.com, where the actual URL is looked up, then the browser is redirected to the correct website. But such a service requires the users to actively manage their web activity, which will certainly limit market penetration.

M5 technology, on the other hand, enables a computer to divine exactly what a sensible language expression is referring to. Thus, if a text entry expresses a concept registered in the parser's table of concepts is inputted into the browser, the browser will be directed to the correct website. The M5 parser can detect registered concepts in text no matter how they are phrased. This method of Web page access becomes possible because the systems and methods described herein can parse meaningful or "sensible" text to a single unique identified concept due to the ability of M5 technology to recognize the precise meaning of registered texts no matter how they are phrased.

Using this method print advertisers can make it easy for customers to get to specific Web pages without the customers having to remember and text in long Web addresses, or navigate Google or other Web search engine to the Web page of interest. And the sponsor of the advertisement could do much more than just direct viewers of advertisements to individual web pages on their sites. An appropriate response might constitute opening more than one specific Web page, or carrying out special instructions included in the free text link. Responses could be performed programmatically by the computer or manually by business personnel of the advertising company. For one example, registered readers could have items on sale shipped directly to their homes and be billed by simply texting the order in their own words like those suggested in the ad that contained the specific offer.

Preferably, the Universal Portal is always immediately accessible on the main screen of a majority of computers and smartphones, ready for text input without having to navigate to it. The Universal Portal could be integrated into a smartphone, a browser application, popular search engine web page, or even an operating system like Microsoft Windows 7. There are several current text input fields like the browser address bar (location bar or URL bar) or the Google search box that can function as a Universal Portal without interfering with their present functions.

But, other conditions apply: to make it worthwhile for a user to type in a page request of several words into the Universal Portal to get to a particular Web page, the user would need to know or be informed that the page is there on the Web, have and be given a general idea of how it is described, and appreciate that the Universal Portal will understand any language expression they might use. It is expected that users "will get the idea" once FTLs start to appear in many print ads.

Thus, when users read the suggested text expression in an advertisement they only need to remember the concept not the actual words. When an advertisement viewer who wants to use the Web address to see what the advertiser wants to present gets to their computer later they do not have to remember the exact URL, write it down, or carry the newspaper or magazine to the computer to copy it from. They do not have to enter the exact words of the suggested text. They have only to enter any fairly accurate paraphrase of the suggested text and M5 technology will recognize the concept and navigate to the exact Web page desired. This procedure becomes possible because Maven or M5 technology enables understanding of meaningful typed-in text no matter how it is worded. Even though many variant paraphrases can precisely state the same concept, A MicroMaven uniquely tuned to that one predetermined registered concept would be waiting on the server to parse the expression no matter how the expression was worded. MicroMavens can be built to recognize almost any same meaning variant text, at least all the ones most likely to be used, even very long ones.

By using M5 technology, the systems and methods described herein make it possible for freely worded but meaningful text entered into the Universal Portal to obtain the same result as entering a Web address. An M5 parser program on a server parses meaningful text entries to identify which text and which advertisement the text was from. However, the parser program must have access to an M5 table containing rows database tuned to the concept meant by the text link.

Figure 8:
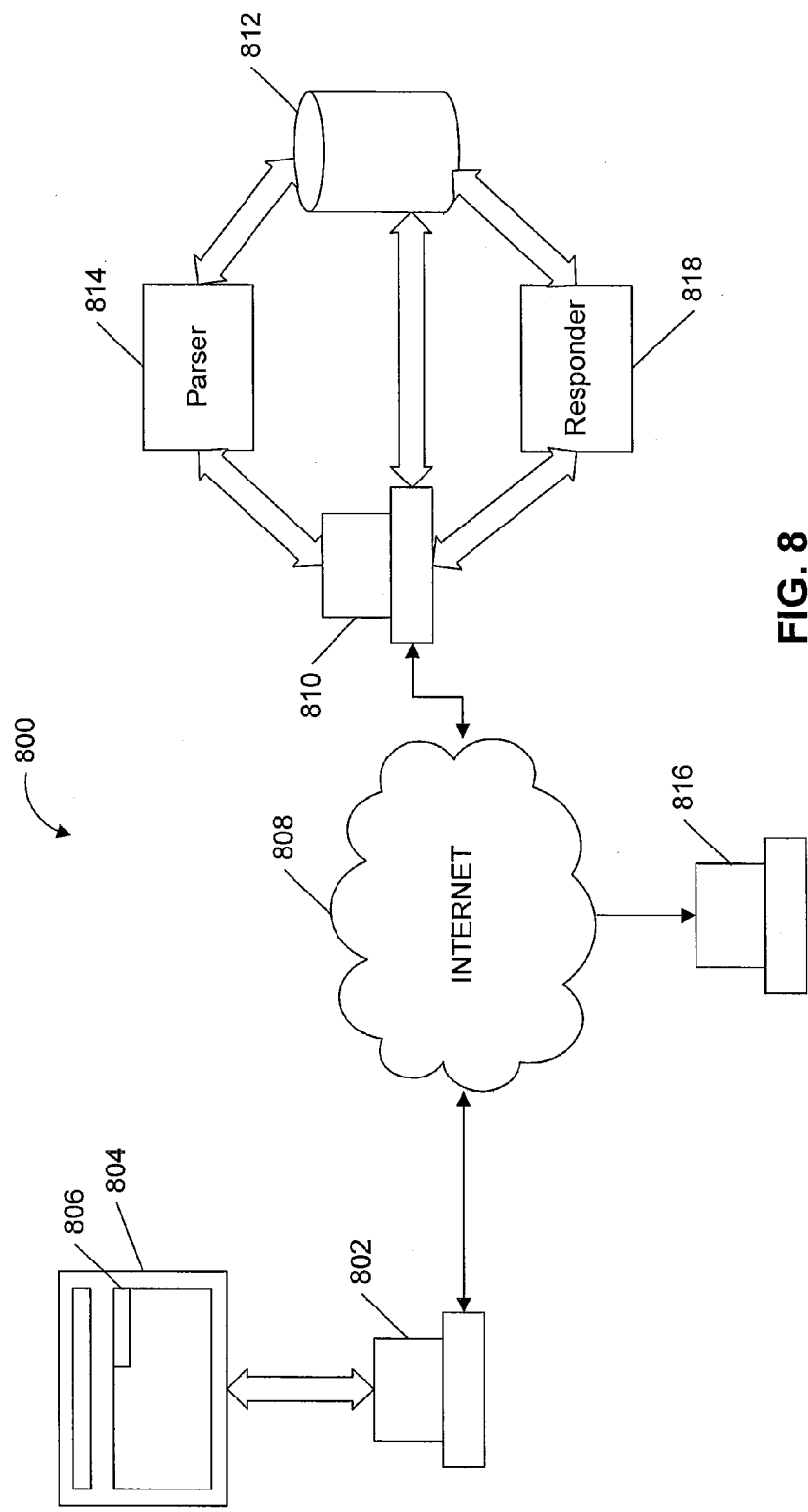
FIG. 8 is a diagram illustrating an example FTL system in accordance with one example embodiment.

FIG. 8 is a diagram that illustrates an example system 800 configured to implement the FTL techniques described herein. System 800 comprises a computing device 802, Maven server 810, and web server 816, all connected via a network such as the Internet 808. Computing device 802 can be a computer, laptop, palmtop, mobile computing device, smartphone, etc. A user associated with computing device 802 uses device 802 to access web pages hosted by web server 816 using, e.g., a browser 804.

Web server 816 can function to provide web pages and contact through browser 804 using well-known techniques that will not be described in detail here. Conventionally, this involves the user inputting a web address or URL into browser 804. The browser is then directed via a router (not shown) to web server 816 associated with the URL. The problem, as described in detail herein, is that these URLs can be long and difficult to remember.

In system 800, browser 804 can include a Universal Portal 806 into which the user can input an FTL. The FTL will direct the browser to Maven server 810, which can host a parser 814 configured to parse the FTL as described above. Server 810 can be interfaced with data storage 812 configured to host one or more MicroMavens. The MicroMavens are constructed around concepts that form the basis for FTLs. Accordingly, if a user enters a natural language phrase that expresses or is close to the FTL concept, parser 814 will interpret the phrase and direct the user to the correct website, i.e., the browser 804 will be connected with web server 816, which will provide the requested page.

Maven server 810 can be a stand alone server. In other embodiments, a search engine companies servers, such as Google, Yahoo, etc., can host or incorporate Maven server 810. In other embodiments, a browser company's servers, such as Microsoft, can host or incorporate the Maven server 810. Thus, the Universal Portal 806 can be incorporated into a search engine page or web browser page.

Maven server 810 can also be referred to as a Universal Portal Provider. A "Universal Portal Provider" can be a business entity whose hardware and software systems combine in a network to create a server environment, where FTL entries from different sources share a single data storage area, or connected data storage areas, that can be accessed simultaneously and efficiently by all users.

A responder module 818 can be included to carry out instructions as responses, as indicated by the MicroMaven. For example, the responder 818 can send the correct web address back to browser 804 and can redirect browser 804 to the correct web address.

Alternatively, responder 818 can respond with a short tag (described below) and then redirect the browser 804. In other embodiments, responder 818 can provide information, such as billing instruction, to a website associated with the web address, e.g., if such instruction has been provided and its use in this manner approved.

A problem lies in that it would likely not be worthwhile for a user to type in a description to open a Web page unless one knew that the page was there and had been Mavenized, i.e. tagged with a text linked to a corresponding M5 MicroMaven on a server 810 tuned to understand any variant wording of it; however, this problem is eliminated if advertisers indicate in ads that there is a Web address that they would like viewers to visit, they include appropriate suggested text that will open the Web page. Thus, advertisements and print articles can indicate with a logo or other signal method that a language tagged Web page does exist on the Web by suggesting a text expression that would access that page if typed into the Universal Portal.

Apart from print advertisements, many authors now include Web addresses that provide useful information supplementary print articles in the articles. However in contrast to commercial advertisers, when authors point their readers to a Web page of interest by the FTL method, they may not be able or willing to "pay per look." Thus, in certain embodiments, Universal Portal Provider 810 can allow authors and other non-commercial users of links in their printed material to offer unlimited looks for a reasonable fixed price. Or provide FTLs free to authors as a public service.

This system can be extended in many ways. For example, placing a cookie, with the user's email, billing info, etc., on the user's computer, could enable very convenient online purchases. Users can then directly order any particular product or service from a business as an immediate result of text entry without further navigation. Alternatively, the Universal Portal Provider 810 can register consenting FTL users on their server like Amazon does. This allows businesses to provide very personalized service.

To be recognized by parser 814, a text input has to make sense and be registered, i.e., be one of the concepts encoded in the table of operations stored in storage 812. Parser 814 intercepts only registered concepts, which are actionable and pertinent. These very specific "filters" or "interceptors" are transparent to regular search entries and do not interfere in any way with the regular function of the browser 804. Thus, parser 814 ignores search criteria composed of ordinary key words and text with other meanings, and so can be seamlessly employed on the front end of search engines or smartphones.

To show that this method of fielding multiple versions of an expression works in practice, a MicroMaven of just 463 database rows has been built that can field 100 billion variant expressions that can correctly state California DMV Law Section 27360: "A child must be strapped in a approved child safety seat in the back seat if he or she is not 6 years old and is not 60 pounds" and reject all incorrect or imprecise statements of that law.

The parser program 814 can translate to a single end concept any unbroken string with specific meaning formed solely from vocabulary words registered in the database. If it has the same meaning it will translate to the same concept. Words and phrases, concepts, not registered in the database are ignored. The most important distinction between a direct command to open a particular Web page and a key word search and navigation to the Webpage is that our system takes full account of the full meaning contributed by grammatical particles and punctuation marks in the text as well as the full meaning engendered by strict order of words.

Many applications arise for the management of the unstructured and semi-structured information stored in text. This is because such a parser is able to parse small or large text inputs and recognize particular passages in the input text that have an expected meaning.

Search engines can generate a new source of revenues by creating and selling these messages to businesses and vendors. Revenue can be generated on a pay per look basis.

Having a list of registered concepts has other useful effects. To use "autosuggest" picking from the list of registered tagged Web pages using registered concepts parsed in the text entry.

While certain embodiments of the inventions have been described above, it will be understood that the embodiments described are by way of example only. Accordingly, the inventions should not be limited based on the described embodiments. Rather, the scope of the inventions described herein should only be limited in light of the claims that follow when taken in conjunction with the above description and accompanying drawings.

What is claimed is:

1. A system for building an interface that receives and responds to varied natural language expressions, the system comprising:
   at least one hardware processor; and
   at least one executable module that, when executed by the at least one hardware processor, builds at least one data structure comprising a plurality of sets of data fields that contain a plurality of concept symbols, wherein the plurality of concept symbols comprise a plurality of elementary concept symbols, wherein each of the plurality of elementary concept symbols corresponds to a natural language element, and a plurality of compound concept symbols, wherein each of the plurality of compound concept symbols corresponds to a pair, wherein the pair comprises one of a first elementary concept symbol and a second elementary concept symbol, an elementary concept symbol and a compound concept symbol, or a first compound concept symbol and a second compound concept symbol,
   wherein each of the plurality of concept symbols identifies a set of data fields, and wherein each set of data fields represents a mental concept and comprises
       an ordering field comprising an ordinal number value that orders the set in order of its creation in the at least one data structure,
       an outline field comprising an ordinal number value that assigns the set to its location in the at least one data structure in an overall outline format,
       a vocabulary field that is either empty or comprises a natural language element corresponding to the concept symbol,
       a concept field comprising the concept symbol,
       a lookup field that is either empty or comprises a pair of concept symbols corresponding to the concept symbol,
       a response field that is either empty or comprises one or more symbols that each identify a response action, and
       an action field that is either empty or defines a response action.

2. The system of claim 1, wherein the at least one executable module generates the plurality of concept symbols, wherein the plurality of concept symbols represent the meaning of a plurality of natural language expressions corresponding to concepts of a domain of knowledge.

3. The system of claim 1, wherein the at least one executable module further:
   sorts the sets of data fields according to one or more of the data fields; and
   searches over one or more of the data fields to identify a set of data fields comprising a search value.

4. The system of claim 3, wherein sorting the sets of data fields comprises sorting the sets of data fields on the outline field, such that the sets of data fields are ordered into sections according to contexts of corresponding concepts within a domain of knowledge.

5. The system of claim 4, wherein the outline field of each set of data fields indicates one or more sections corresponding to book, chapter, paragraph, sentence, or sub-sentence sections of a text corresponding to the domain of knowledge.

6. The system of claim 4, wherein the at least one executable module further restricts searching over the sets of data fields to a local search of a restricted subset of the sorted sets of data fields.

7. The system of claim 6, wherein the at least one executable module receives a range for the restricted subset.

8. The system of claim 6, wherein the at least one executable module further:
   restricts parsing to natural language expressions that comprise language elements that are present in the vocabulary fields of sets of data fields within the restricted subset; and,
   if a natural language expression comprises language elements that are not present in the vocabulary fields of sets of data fields within the restricted subset, provides an indication that the natural language expression is not understood.

9. The system of claim 1, wherein the at least one executable module further:
adds one or more response action concept symbols to the response field of one or more sets of data fields; and,
for each response action concept symbol, adds a set of data fields comprising an action field to the at least one data structure, wherein the action field specifies an action from a repertoire of available actions.

10. The system of claim 1, wherein the at least one executable module further:
receives a natural language expression, wherein the natural language comprises either text or audio;
parses the natural language expression into an ordered string of natural language elements comprising one or more of lexical words, grammaticals, and punctuation marks;
converts the ordered string of natural language elements into an ordered string of concept symbols by
identifying in the at least one data structure one or more sets of data fields with one of the natural language elements in the vocabulary field, and,
for each identified one or more sets of data fields, replaces the corresponding natural language element in the ordered string with a concept symbol in the concept field of that set of data fields;
parses the ordered string of concept symbols until the ordered string of concept symbols comprises a single concept symbol, wherein the parsing comprises
identifying ordered pairs of adjacent concept symbols,
searching the lookup field of one or more sets of data fields of the at least one data structure to identify one or more sets of data fields comprising a lookup field that comprises one of the ordered pairs of adjacent concept symbols, and
replacing one or more ordered pairs of adjacent concept symbols in the string of ordered concept symbols with a concept symbol from the concept field of the identified one or more sets of data fields, thereby shortening the ordered string of concept symbols; and,
if the ordered string of concept symbols is parsed to a single concept symbol, selects and performs at least one response action associated with the single concept symbol.

11. The system of claim 10, wherein the at least one executable module further, if the ordered string of concept symbols cannot be parsed to a single concept symbol, provides an indication that the natural language expression is not understood.

12. The system of claim 1, wherein the at least one executable module further:
receives a concept symbol string comprising a single source concept symbol; and
generates, from a single source concept symbol, one or more natural language expressions that express the meaning of the single source concept symbol, wherein the generation comprises, for each of one or more versions of the concept symbol string, until the concept symbol string comprises only language elements, for each concept symbol in the concept symbol string,
identifying one or more sets of data fields in the at least one data structure which comprise a concept field that comprises that concept symbol,
if the lookup field of the identified one or more sets of data fields comprises a pair of concept symbols, replacing the concept symbol in the concept symbol string with the pair of concept symbols, thereby lengthening the concept symbol string by one concept symbol, and,
if the lookup field of the identified one or more set of data fields is empty, replacing the concept symbol in the concept symbol string with a language element from a vocabulary field of the identified one or more sets of data fields.

13. A system for building an interface that receives and responds to varied natural language expressions, the system comprising:
at least one hardware processor; and
at least one executable module that, when executed by the at least one hardware processor,
builds at least one data structure comprising a plurality of sets of data fields that contain a plurality of concept symbols, wherein the plurality of concept symbols comprise a plurality of elementary concept symbols, wherein each of the plurality of elementary concept symbols corresponds to a natural language element, and a plurality of compound concept symbols, wherein each of the plurality of compound concept symbols corresponds to a pair, wherein the pair comprises one of a first elementary concept symbol and a second elementary concept symbol, an elementary concept symbol and a compound concept symbol, or a first compound concept symbol and a second compound concept symbol,
for each of one or more domains of knowledge, receives one or more standard natural language expressions that express concepts of the domain of knowledge, wherein a standard natural language expression comprises text or audio, and
divides each standard natural language expression into language subsections, each of the language subsections comprising one or more language elements, wherein each language element comprises a word or punctuation mark and each language subsection expresses a sub-concept of a domain of knowledge.

14. The system of claim 13, wherein the at least one data structure comprises one or more relational databases.

15. The system of claim 13, wherein the at least one executable module further receives one or more synonyms acceptable in the context for one or more language elements, and receives one or more paraphrases acceptable in the context for one or more language subsections comprising two or more language elements.

16. The system of claim 15, wherein the at least one executable module further, for each of the language subsections, one or more synonyms, and one or more paraphrases:
parses the language subsection, synonym, or paraphrase into an ordered string of language elements comprising one or more of lexical words, grammaticals, and punctuation marks;
converts the ordered string of language elements into an ordered string of elementary concept symbols;
replaces each language element with a generated concept symbol corresponding to that language element to form an ordered string of concept symbols;
parses the ordered string of concept symbols until the ordered string of concept symbols comprises a single concept symbol, wherein the parsing comprises
identifying one or more ordered pairs of adjacent concept symbols in the ordered string of concept symbols, and replacing the identified one or more ordered pairs of adjacent concept symbols in the string of ordered concept symbols with a generated compound concept symbol, thereby shortening the ordered string of concept symbols; and, for each generated concept symbol, adding a set of data fields to the at least one data structure, wherein the set of data fields comprises at least an ordinal number, the generated concept symbol, and, if the generated concept symbol is a compound concept symbol, a pair of adjacent concept symbols which were replaced by the compound concept symbol.

17. The system of claim 16, wherein a same concept symbol is used for a language subsection and its corresponding paraphrases, and wherein a same concept symbol is used for a language element and its corresponding synonyms.

18. The system of claim 17, wherein the at least one executable module adds further sets of data fields to the at least one data structure, wherein each of the further sets of data fields comprises an order field comprising an ordinal number, a lookup field comprising a pair of concept symbols, and a concept field comprising a concept symbol representing the pair of concept symbols, wherein the further sets of data fields enable parsing of one or more of the language subsections, one or more synonyms, and one or more paraphrases into a single concept symbol representing at least one of the one or more standard natural language expressions.

19. The system of claim 16, wherein the at least one executable module further, if the ordered string of concept symbols cannot be parsed to a single concept symbol, provides an indication that a corresponding one of the one or more standard natural language expressions is not understood.

20. The system of claim 16, wherein the at least one executable module adds the set of data fields to the at least one data structure during the parsing of the ordered string of concept symbols.

21. The system of claim 16, wherein the added sets of data fields comprise a first set of data fields comprising a concept symbol and a pair of concept symbols, and a second set of data fields comprising the same concept symbol and the pair of concept symbols in reverse order.

* * * * *